(12) United States Patent
Petrus

(10) Patent No.: US 12,552,004 B2
(45) Date of Patent: Feb. 17, 2026

(54) BATTERY PACK ISOLATION SYSTEM

(71) Applicant: BLACK & DECKER INC., New Britain, CT (US)

(72) Inventor: Tyler Petrus, Baltimore, MD (US)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 18/396,960

(22) Filed: Dec. 27, 2023

(65) Prior Publication Data

US 2024/0139929 A1    May 2, 2024

Related U.S. Application Data

(63) Continuation of application No. 17/836,408, filed on Jun. 9, 2022, now Pat. No. 11,890,740.

(60) Provisional application No. 63/208,559, filed on Jun. 9, 2021.

(51) Int. Cl.
*B25F 5/00* (2006.01)
*H01M 50/242* (2021.01)
*H01M 50/247* (2021.01)
*H02J 7/00* (2006.01)

(52) U.S. Cl.
CPC ........... *B25F 5/006* (2013.01); *H01M 50/242* (2021.01); *H01M 50/247* (2021.01); *H02J 7/0045* (2013.01); *H01M 2220/30* (2013.01)

(58) Field of Classification Search
CPC .... B25F 5/006; H01M 50/242; H01M 50/247
See application file for complete search history.

(56) References Cited

U.S. PATENT DOCUMENTS

| | | | |
|---|---|---|---|
| 5,375,666 A | 12/1994 | Pettet et al. |
| 5,641,294 A | 6/1997 | Beard |
| 7,625,228 B2 | 12/2009 | Doumani |
| 7,766,097 B2 | 8/2010 | Kondo |
| 8,062,060 B2 | 11/2011 | Rejman |
| 8,123,098 B2 | 2/2012 | Miyata |

(Continued)

FOREIGN PATENT DOCUMENTS

| | | |
|---|---|---|
| CN | 206040735 U | 3/2017 |
| CN | 209880708 U | 12/2019 |

(Continued)

OTHER PUBLICATIONS

International Search Report and Written Opinion, PCT Application No. PCT/US2022/032807, Nov. 7, 2022, 9 pages, USPTO.

(Continued)

*Primary Examiner* — Eyamindae C Jallow
(74) *Attorney, Agent, or Firm* — Michael Aronoff

(57) ABSTRACT

The present disclosure is directed to a cordless power tool vibration isolation system. A solution to negative impacts of vibration on a removable battery pack caused by operation of a cordless power tool. Isolating the battery pack from the power tool reduces wear and tear on the battery pack including the pack housing, the pack terminals and internal pack components. A battery pack interface of the power tool including a discrete interface housing that mates with the battery pack and a vibration isolation element that separates and isolates the combination of the discrete interface housing and the battery pack from the power tool and the power tool's associated motor induced vibrations.

5 Claims, 28 Drawing Sheets

(56) References Cited

U.S. PATENT DOCUMENTS

| | | | |
|---|---|---|---|
| 8,496,073 | B2 | 7/2013 | Eisenhardt et al. |
| 9,308,636 | B2 | 4/2016 | Wyler |
| 9,748,534 | B2 | 8/2017 | Hanawa et al. |
| 9,774,017 | B2 | 9/2017 | Uchida et al. |
| 9,849,577 | B2 | 12/2017 | Wyler et al. |
| 10,076,833 | B2 * | 9/2018 | Tada .................. H01M 50/247 |
| 10,195,730 | B2 | 2/2019 | Wyler et al. |
| 10,232,479 | B2 | 3/2019 | Thorson et al. |
| 10,263,228 | B2 | 4/2019 | Nishikawa et al. |
| 10,661,426 | B2 | 5/2020 | Aoki |
| 2003/0134189 | A1 | 7/2003 | Kanai et al. |
| 2005/0058890 | A1 | 3/2005 | Brazell et al. |
| 2008/0220324 | A1 | 9/2008 | Phillips et al. |
| 2008/0302552 | A1 | 12/2008 | Kondo |
| 2010/0092850 | A1 | 4/2010 | Ueda et al. |
| 2010/0224666 | A1 | 9/2010 | Miyata |
| 2010/0263896 | A1 | 10/2010 | Brennenstuhl et al. |
| 2012/0171539 | A1 | 7/2012 | Rejman et al. |
| 2012/0251861 | A1 | 10/2012 | Liang et al. |
| 2013/0149581 | A1 | 6/2013 | Yoshikawa |
| 2013/0196203 | A1 | 8/2013 | Wackwitz et al. |
| 2013/0260212 | A1 * | 10/2013 | Kohno ................ H01M 50/538 |
| | | | 429/158 |
| 2014/0047722 | A1 | 2/2014 | Onose et al. |
| 2014/0318821 | A1 * | 10/2014 | Wyler .................... B25F 5/006 |
| | | | 173/104 |
| 2014/0326477 | A1 | 11/2014 | Thorson et al. |
| 2015/0032582 | A1 | 1/2015 | Liu et al. |
| 2015/0214520 | A1 | 7/2015 | Nishikawa et al. |
| 2015/0249237 | A1 | 9/2015 | Naito |
| 2015/0328764 | A1 | 11/2015 | Yoshikane et al. |
| 2015/0343617 | A1 * | 12/2015 | Kondo ..................... B25B 21/02 |
| | | | 173/93 |
| 2015/0357612 | A1 | 12/2015 | Uchida et al. |
| 2017/0173748 | A1 | 6/2017 | Ullrich et al. |
| 2018/0019399 | A1 | 1/2018 | Brug et al. |
| 2018/0117728 | A1 | 5/2018 | Kawakami et al. |
| 2018/0169851 | A1 | 6/2018 | Radovich et al. |
| 2018/0198101 | A1 | 7/2018 | Sheeks et al. |
| 2018/0304504 | A1 | 10/2018 | Lee |
| 2019/0001477 | A1 | 1/2019 | Ullrich et al. |
| 2019/0027718 | A1 | 1/2019 | Marinov |
| 2019/0193223 | A1 * | 6/2019 | Thorson ............. B23Q 11/0032 |
| 2019/0210207 | A1 | 7/2019 | Ren et al. |
| 2019/0283061 | A1 | 9/2019 | Qiao |
| 2019/0372182 | A1 | 12/2019 | Takayasu |
| 2020/0215678 | A1 * | 7/2020 | Nakashima ............. B25F 5/006 |
| 2020/0215679 | A1 | 7/2020 | Tamura et al. |
| 2020/0227799 | A1 | 7/2020 | Fukutome et al. |
| 2020/0246958 | A1 * | 8/2020 | Krupsaw .................. B25F 5/02 |
| 2021/0237249 | A1 * | 8/2021 | Fischer .................. B25F 5/006 |

FOREIGN PATENT DOCUMENTS

| | | |
|---|---|---|
| CN | 210770015 U | 6/2020 |
| CN | 211670302 U | 10/2020 |
| DE | 102013201504 A1 | 7/2014 |
| DE | 202017105258 U1 | 9/2017 |
| DE | 102016118805 A1 | 4/2018 |
| EP | 1462222 A1 | 9/2004 |
| EP | 2885113 A2 | 6/2015 |
| EP | 3500405 A1 | 6/2019 |
| GB | 2432036 A | 5/2007 |
| GB | 2486986 A | 7/2012 |
| GB | 2493333 A | 2/2013 |
| JP | 6661328 B2 | 3/2020 |
| WO | 2017108414 A1 | 6/2017 |
| WO | 18036720 A1 | 3/2018 |
| WO | 2019214447 A1 | 11/2019 |
| WO | 2020001943 A1 | 1/2020 |
| WO | 2020125450 A1 | 6/2020 |

OTHER PUBLICATIONS

Communication pursuant to Rule 164(1) EPC, EP Application No. 22821019.1, Mar. 28, 2025, 15 pages, EPO.

* cited by examiner

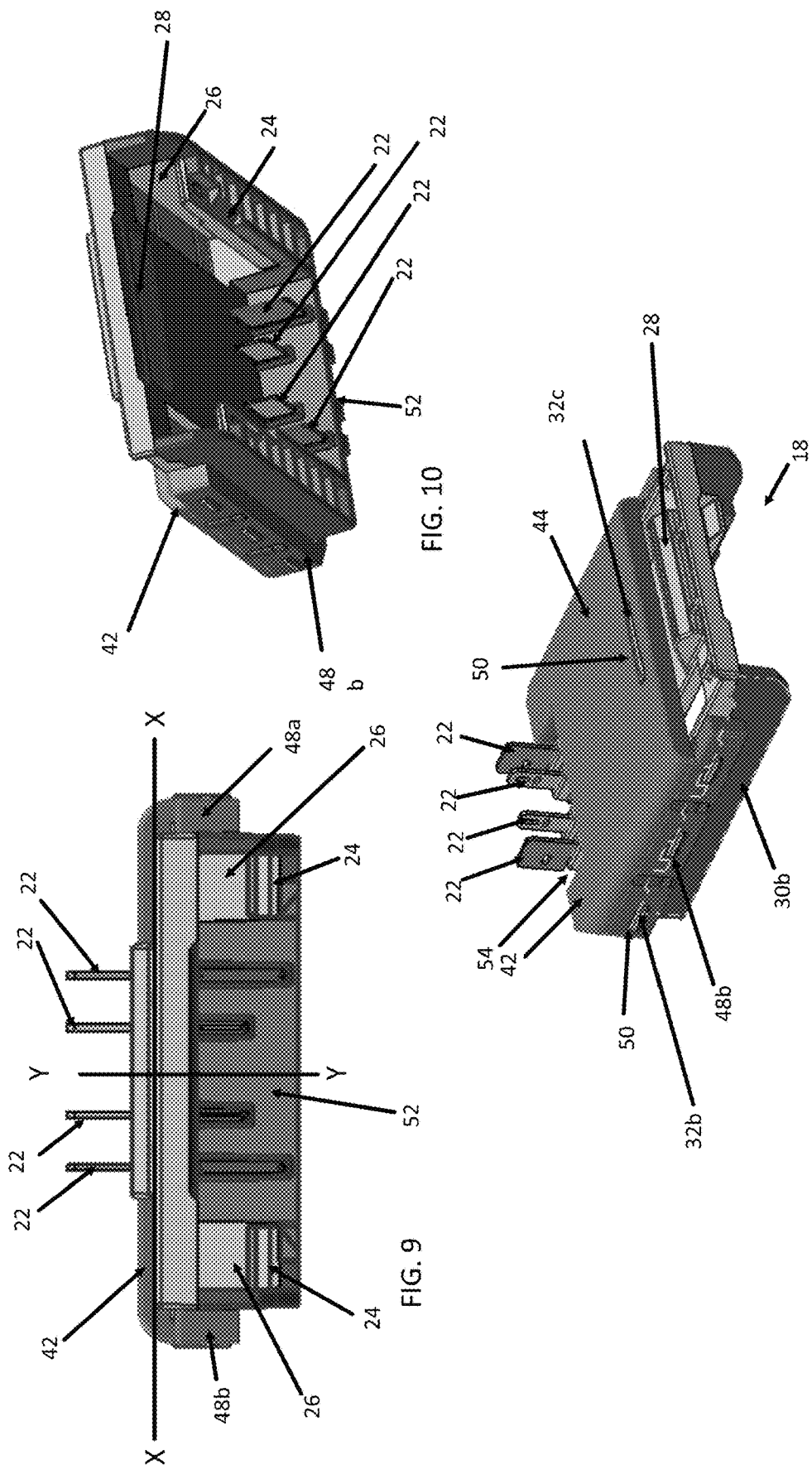

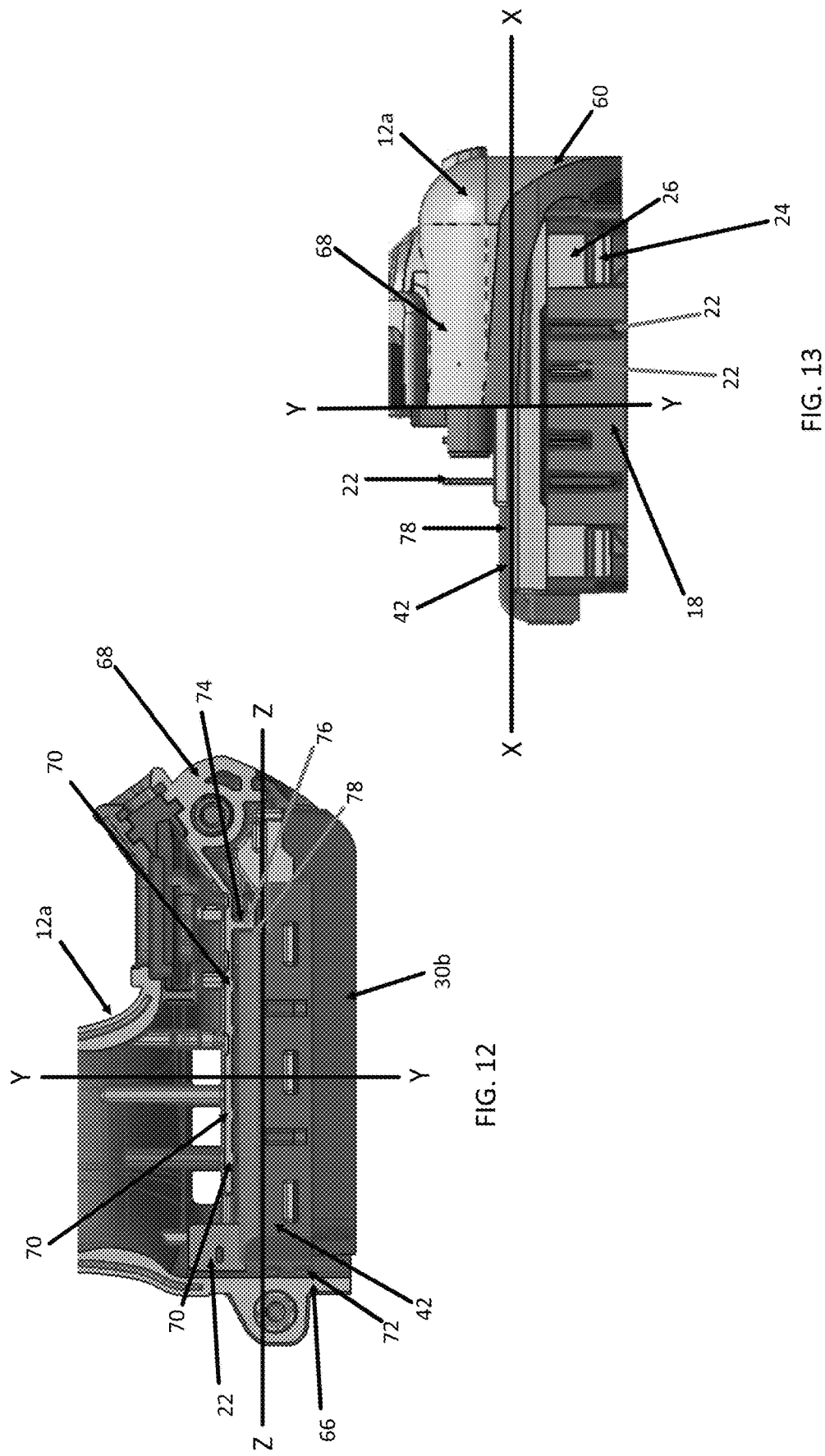

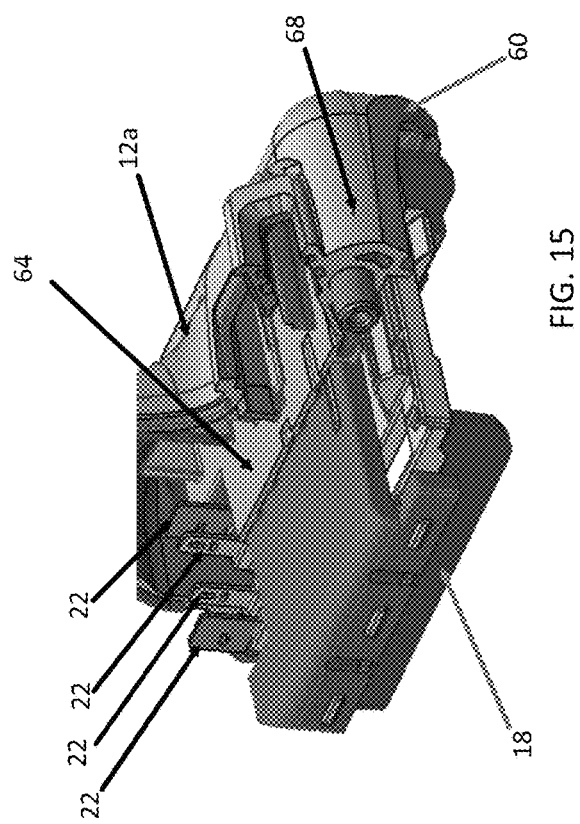
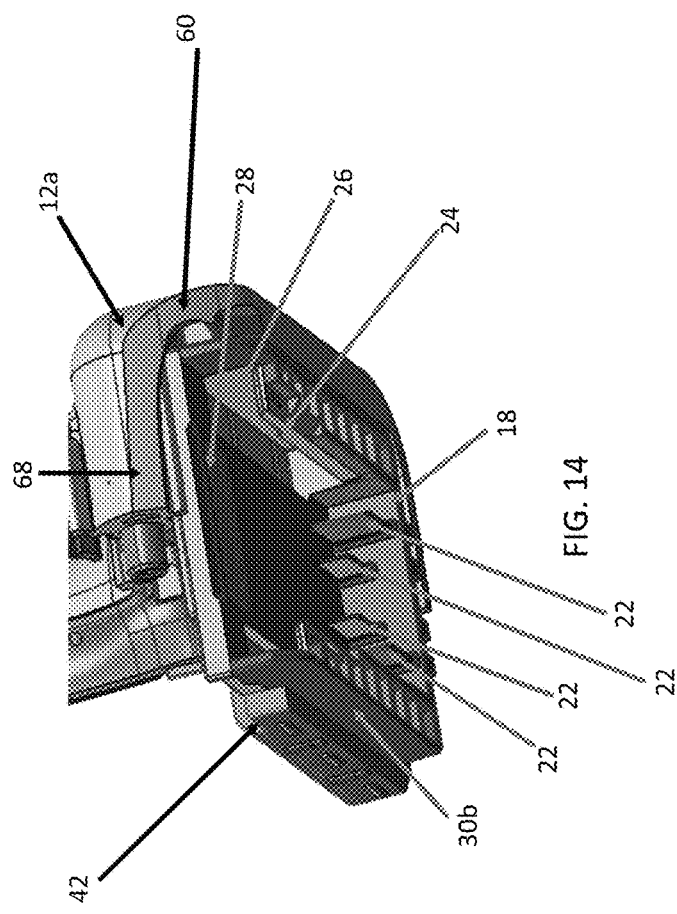

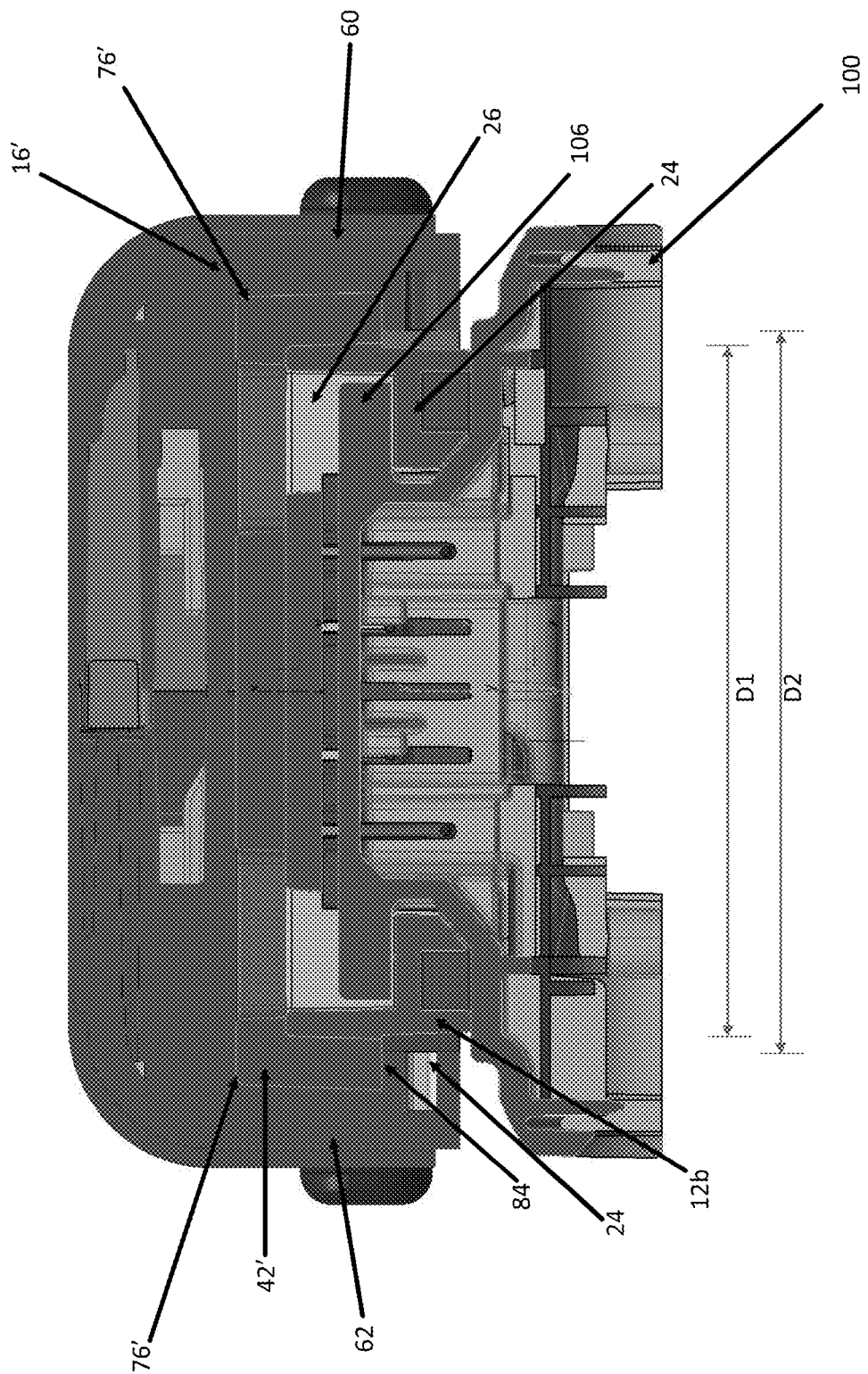

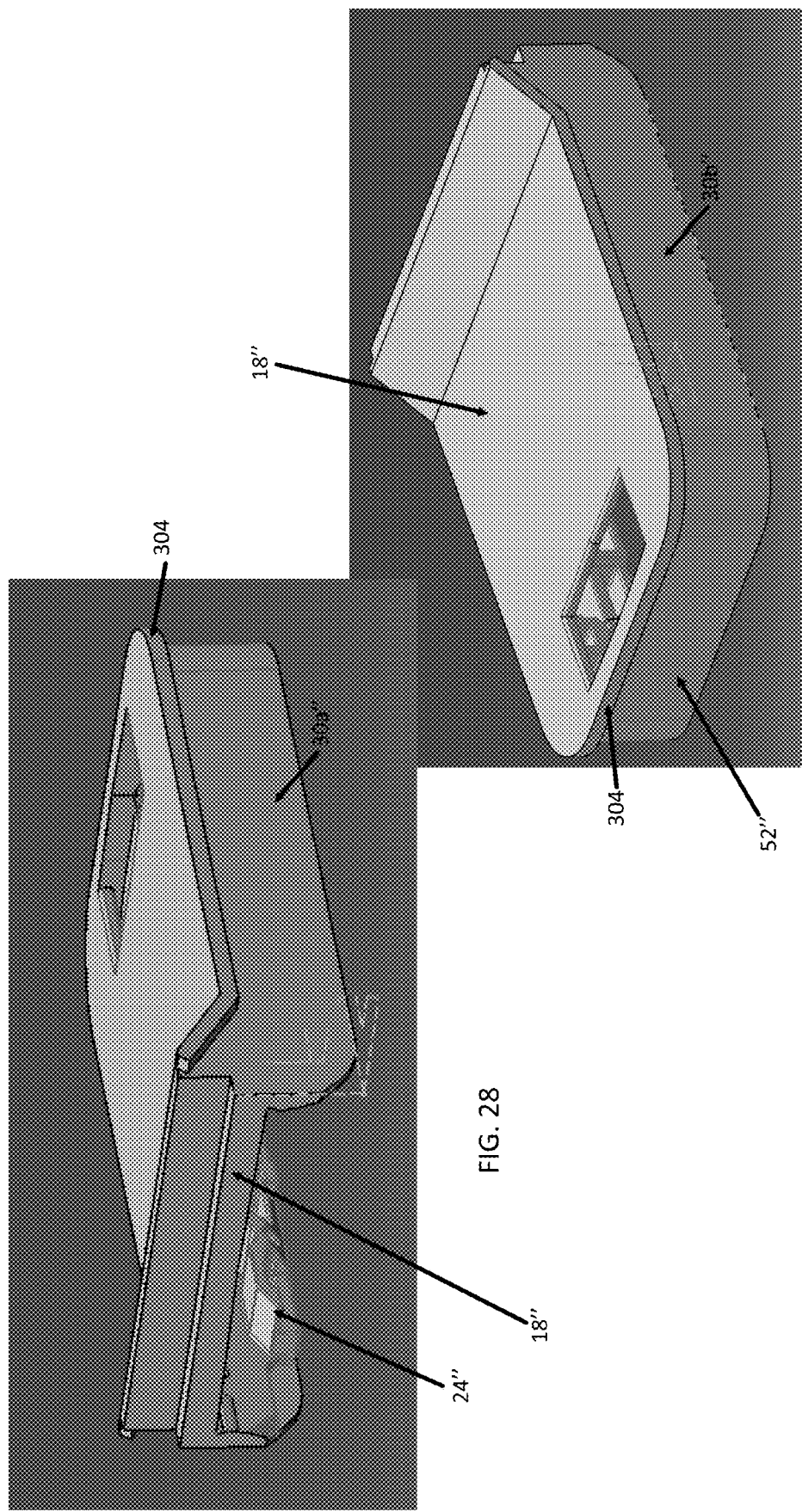

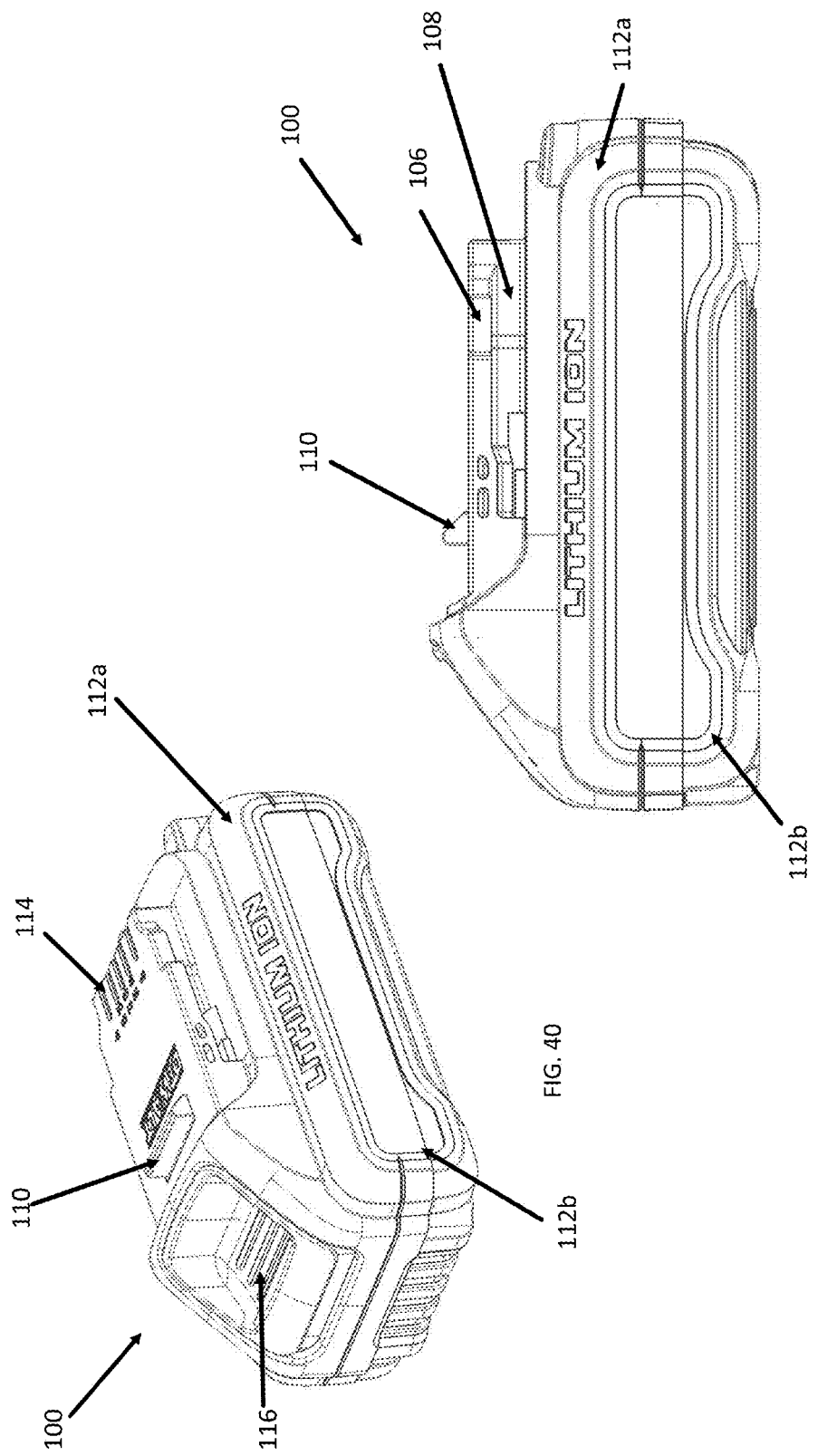

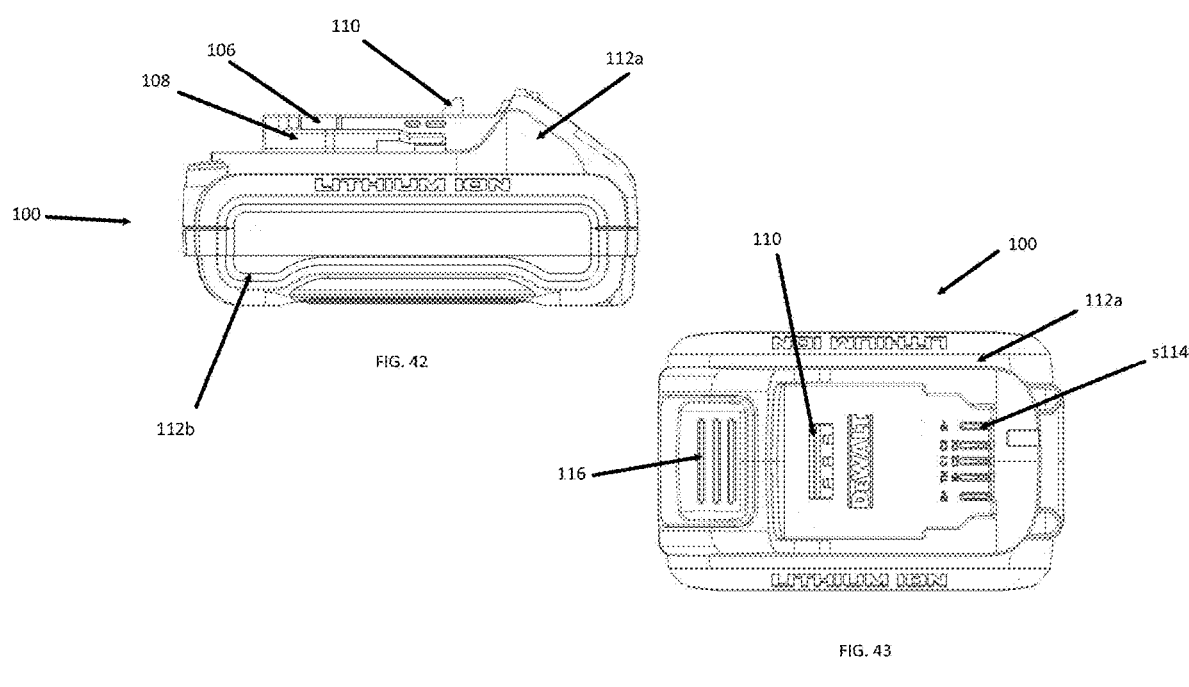

BATTERY PACK ISOLATION SYSTEM

RELATED APPLICATIONS

This application claims priority, under 35 U.S.C. § 120, as a continuation of U.S. patent application Ser. No. 17/836,408, filed Jun. 9, 2022, titled "Battery Pack Isolation System," which claims priority under 35 U.S.C. § 119(e) to U.S. Provisional Patent Application No. 63/208,559, filed Jun. 9, 2021, titled "Battery Pack Isolation System."

TECHNICAL FIELD

This application relates to a power tool and a detachable battery pack and an isolation system for isolating the battery pack from the power tool with respect to vibrations caused by a motor of the power tool and a method for isolating the battery pack from the power tool with respect to vibrations caused by the power tool motor. In one implementation, the power tool includes a vibration isolation element positioned between a battery pack interface of the power tool and a housing of the power tool.

BACKGROUND

The instant application describes an exemplary vibration isolation element for a power tool energized by a removable battery pack. The power tool includes an electric motor. The power tool includes a tool application element such as a saw blade or a wrench. Vibrations from operation of the power tool, either from the motor or from the tool application element can negatively affect an interface between the power tool and the battery pack. This can include the breaking of rails on a battery pack or rails on a power tool.

SUMMARY

An aspect of the present invention includes a power tool including a power tool housing having a battery pack receptacle, a battery pack interface and a vibration isolation element positioned between the battery pack receptacle and the battery pack interface.

Another aspect of the present invention includes a power tool including power tool housing and a battery pack interface for receiving and mating with a removable battery pack, and a vibration isolation element, the vibration isolation element positioned between the power tool housing and the battery pack interface to enable the battery pack interface to have six-degrees of freedom (movement) relative to the power tool housing. The power tool housing being physically isolated from the battery pack interface. In other words, the power tool housing does not touch the battery pack interface.

A battery pack interface including a housing and a set of terminals. The battery pack interface housing and the set of terminals may be integrally formed. The battery pack interface housing includes a set of grooves and a set of rails designed and configured to cooperate/mate with a correspondingly designed and configured set of grooves and a set of rails of a power tool interface of a removable battery pack. The set of terminals may be placed in a mold and hard plastic material may be injection molded into the mold to fix the set of terminals relative to each other. In this configuration, the battery pack interface rails and the power tool terminals are integrally formed in a single piece. The single piece terminals/rails assembly is divorced from the power tool housing/receptacle with 6 degrees of freedom. A vibration isolation element is positioned between the power tool housing and the terminals/rail assembly. The vibration isolation element may be made of an elastic material and serves to dampen the transmission of vibrations from the power tool to the battery pack.

As the power tool terminals and battery pack interface rails are integrally formed the battery and battery terminals move in unison with the power tool terminals and the battery pack interface. This reduces wear between the power tool terminals and the battery pack terminals and the between the power tool rails and the battery pack rails.

These and other advantages and features will be apparent from the description and the drawings.

BRIEF DESCRIPTION OF THE DRAWINGS

FIG. 9 is a front elevation view of the battery pack interface and the vibration isolation element of FIG. 8.

FIG. 10 is a lower, front, right side isometric view of the battery pack interface and the vibration isolation element of FIG. 8.

FIG. 11 is an upper, front, right side isometric view of the battery pack interface and the vibration isolation element of FIG. 8.

FIG. 12 is a right side, elevation view of the battery pack interface and the vibration isolation element of FIG. 8 and a portion of a power tool housing of the power tool of FIG. 1.

FIG. 13 is a front elevation view of the portion of the power tool housing, the battery pack interface and the vibration isolation element of FIG. 12.

FIG. 14 is a lower, front, right side isometric view of the portion of the power tool housing, the battery pack interface and the vibration isolation element of FIG. 12.

FIG. 15 is an upper, front, right side isometric view of the portion of the power tool housing, the battery pack interface and vibration isolation element of FIG. 12.

FIG. 26 is a section view of the portion of the power tool, the battery pack interface and the vibration isolation element of FIG. 25 coupled to an example battery pack.

FIG. 28 is an upper, front, left side isometric view of the battery pack interface of FIG. 27.

FIG. 29 is an upper, rear, right side isometric view of the battery pack interface of FIG. 27.

FIG. 40 is an upper, front, left side isometric view of the battery pack of FIG. 38.

FIG. 41 is a left side, elevation view of the battery pack of FIG. 38.

FIG. 42 is a right side, elevation view of the battery pack of FIG. 38.

FIG. 43 is a top, plan view of the battery pack of FIG. 38.

DETAILED DESCRIPTION

Figure 1:
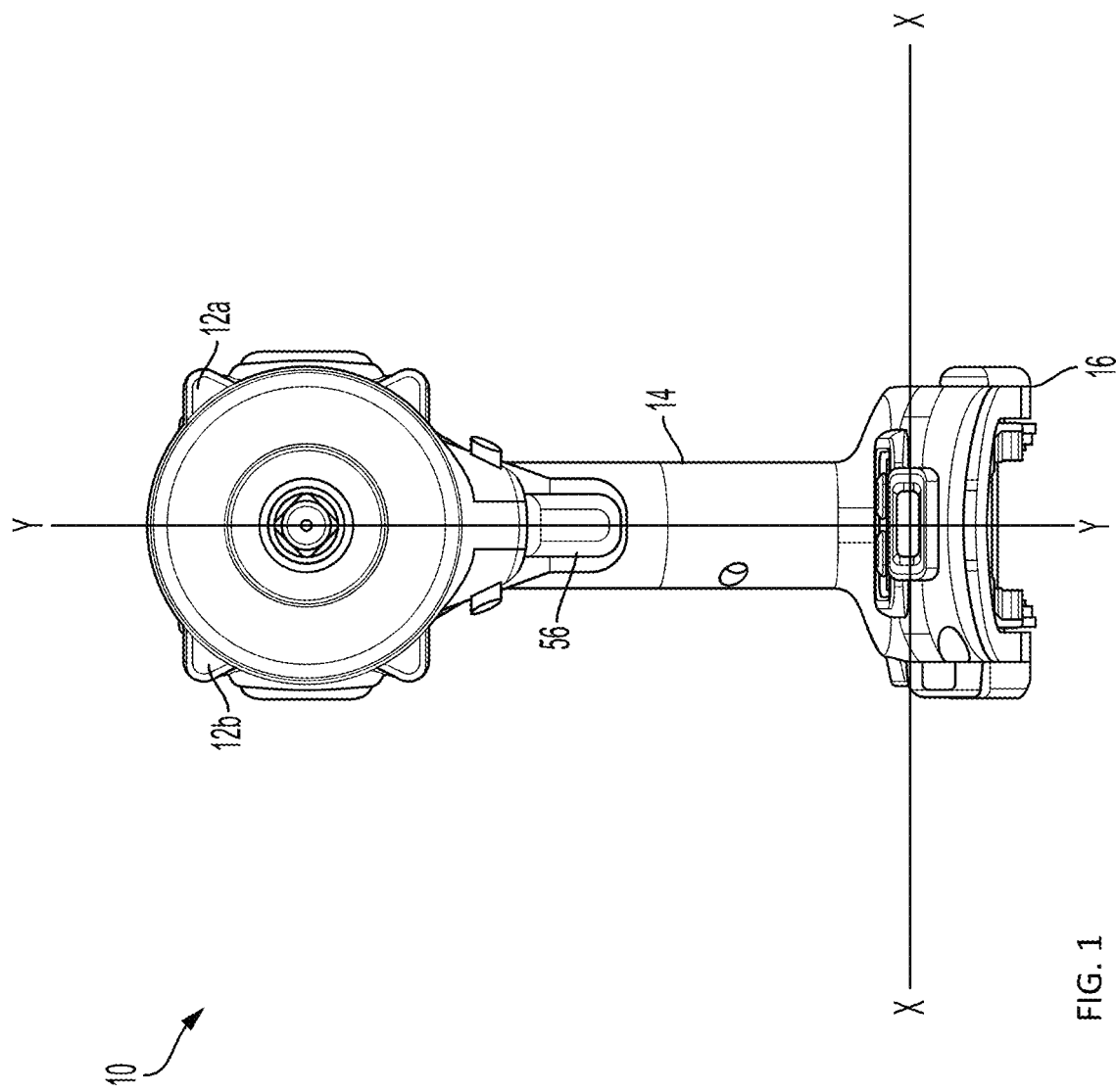
FIG. 1 is a front elevation view of an example power tool.
Figure 2:
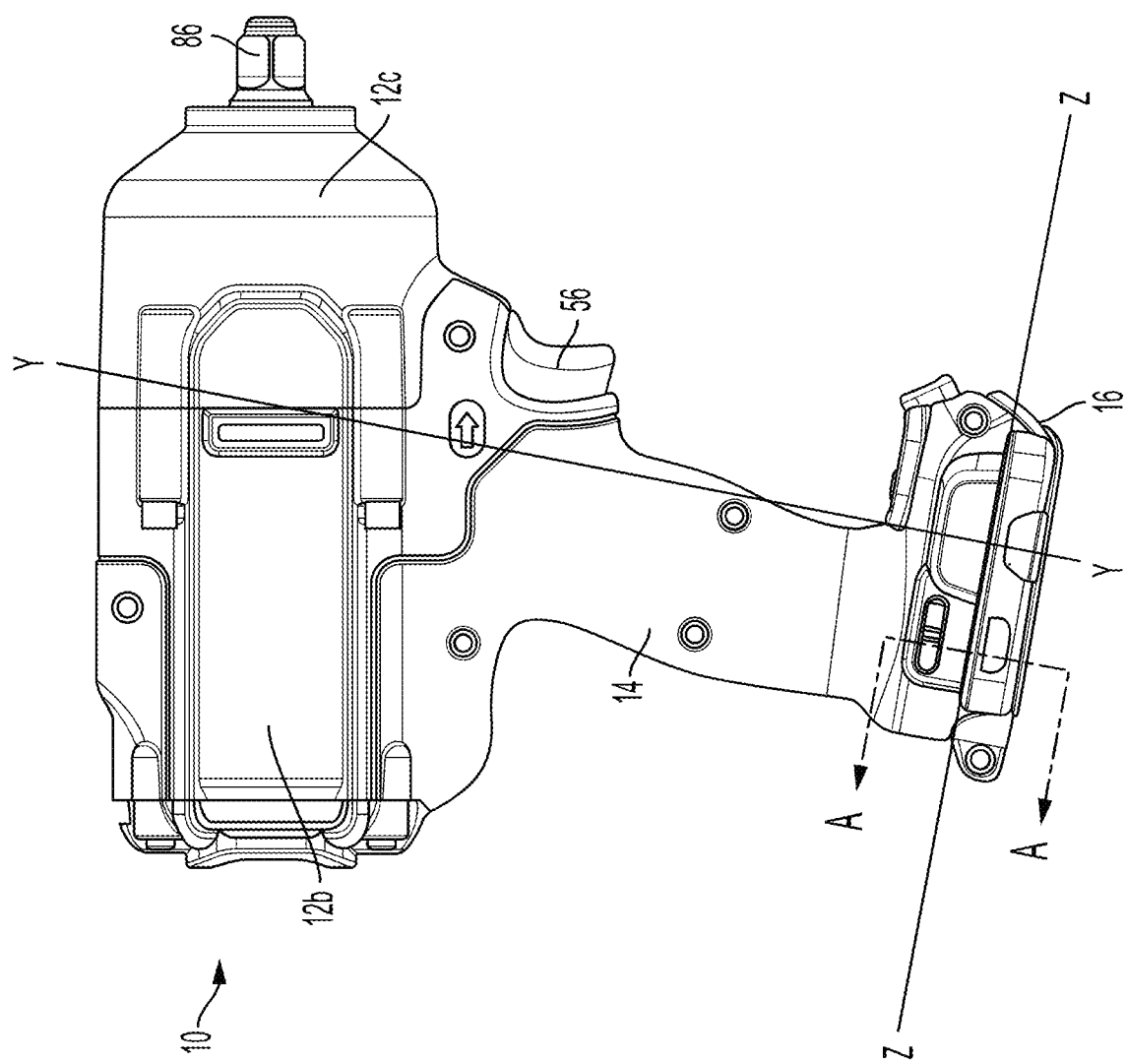
FIG. 2 is a right, side elevation view of the power tool of FIG. 1.
Figure 3:
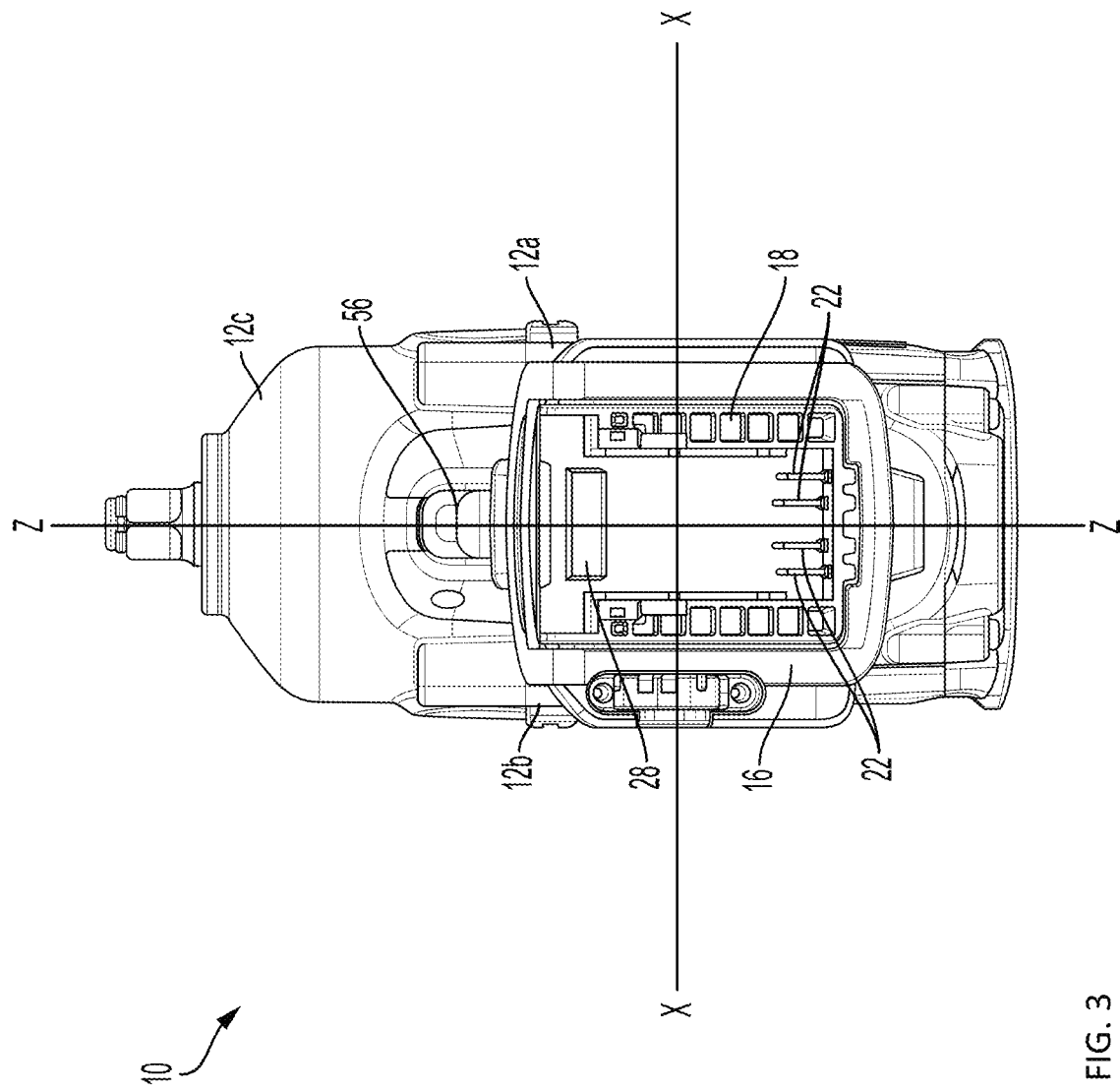
FIG. 3 is a bottom plan view of the power tool of FIG. 1.
Figure 4:
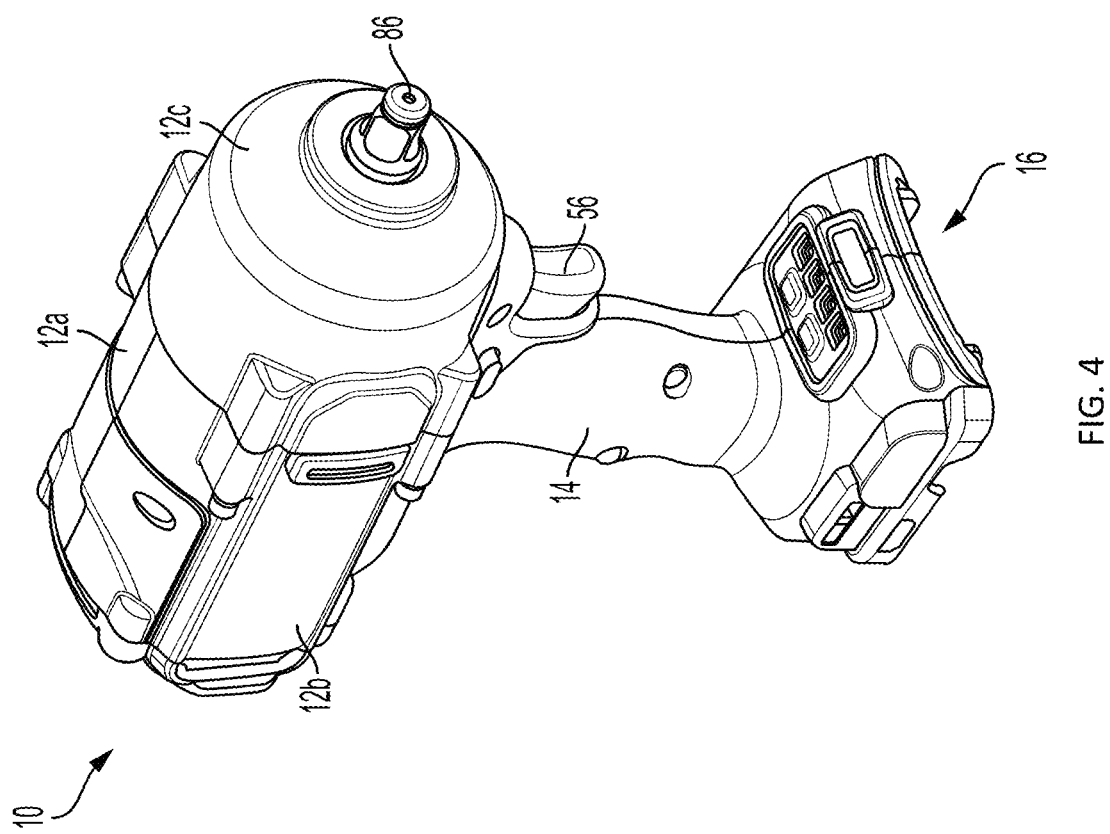
FIG. 4 is an upper, front, right side isometric view of the power tool of FIG. 1.

Referring to FIGS. 1-4, there is illustrated an example embodiment of a power tool 10 of a set of electric power tools. The illustrated example power tool 10 is an impact drill. The set of power tools may include but is not limited to other power tools such as reciprocating saws, hammer drills, circular saws. The example power tool 10 is powered by a removable (detachable), rechargeable (secondary) battery pack 100. FIGS. 38-43 illustrate an example battery pack 100. Other, similar, battery packs may be used with the example set of power tools. The power tool 10 may be oriented about three axis. An X-axis, a Y-axis, and a Z-axis. The X-axis defines the power tool 10 generally in the left and right directions in the orientation of FIG. 1. The Y-axis defines the power tool 10 generally in the up and down directions in the orientation of FIG. 1. The Z-axis defines the power tool 10 generally in the in and out directions in the orientation of FIG. 1. It should be noted that the Z-axis relationship to the power tool 10 and the X-axis and the Y-axis is better illustrated in FIG. 2. The X-axis is perpendicular to the Y-axis and the Z-axis. The Y-axis is perpendicular to the X-axis and the Z-axis. The Z-axis is perpendicular to the X-axis and the Y-axis. The power tool 10 includes a housing 12. The housing 12 may include a left housing portion 12a and a right housing portion 12b. The left housing portion 12a and the right housing portion 12b may mate at a plane formed by the Y-axis and the Z-axis—the YZ-plane. The housing 12 may also include a motor cover portion 12c. The housing 12 may include a handle 14 and a battery pack receptacle 16. In the example power tool 10, the battery pack receptacle 16 is located in a tool foot 18. Other power tools in the set of power tools, may include a battery pack receptacle located in a different relative location. For example, a saw, not having a foot in the same sense as a drill, may have the battery pack receptacle simply close to the handle.

Figure 5:
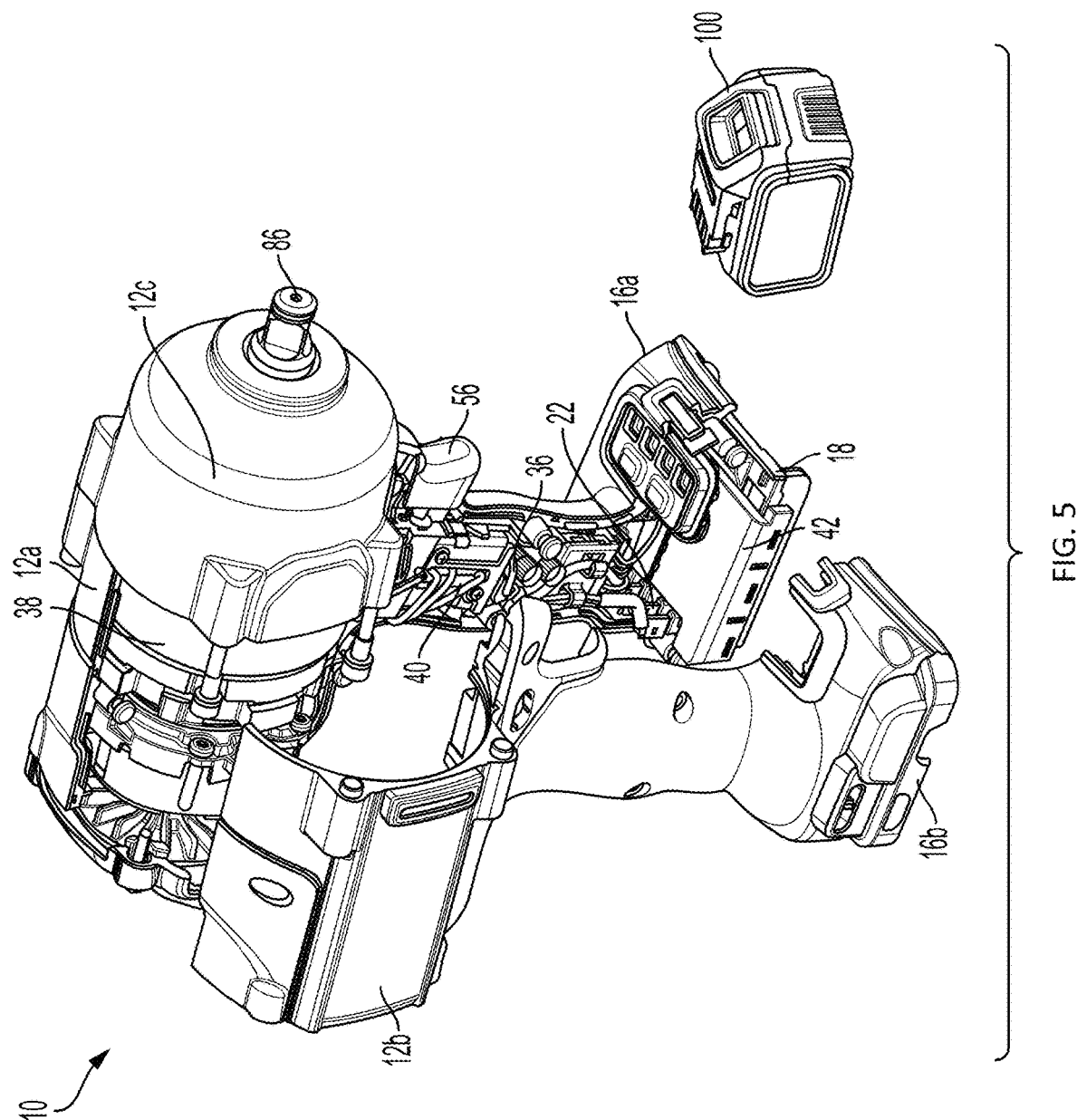
FIG. 5 is a partially exploded view of the power tool of FIG. 1.
Figure 6:
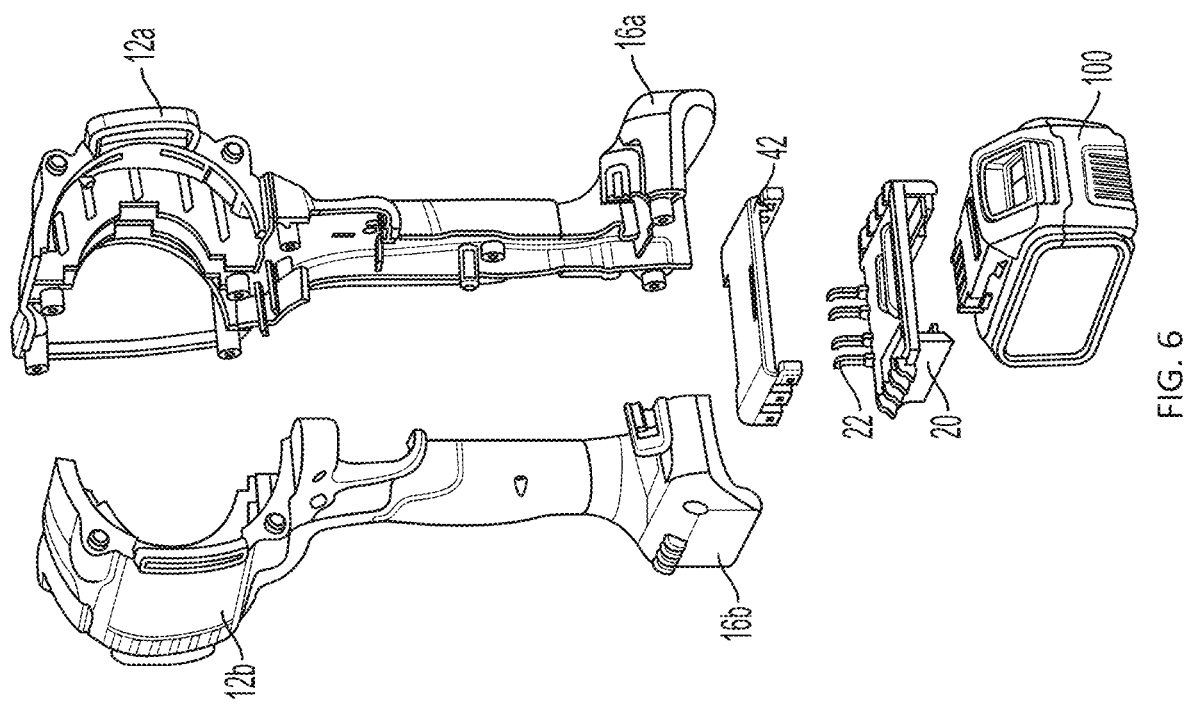
FIG. 6 is a simplified, exploded view of the power tool of FIG. 1.
Figure 7:
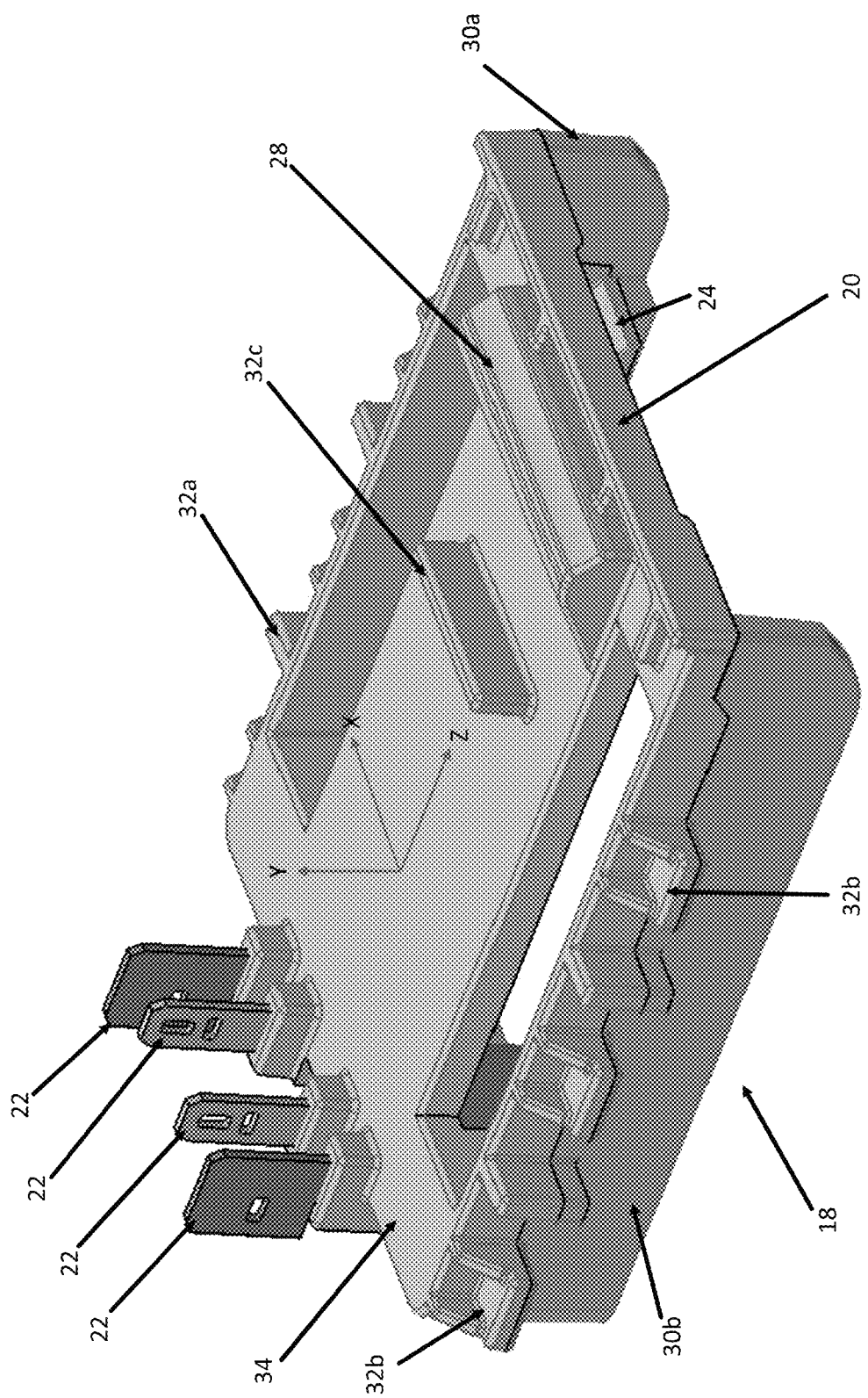
FIG. 7 is an upper, front, right side isometric view of an example battery pack interface of the power tool of FIG. 1.
Figure 8:
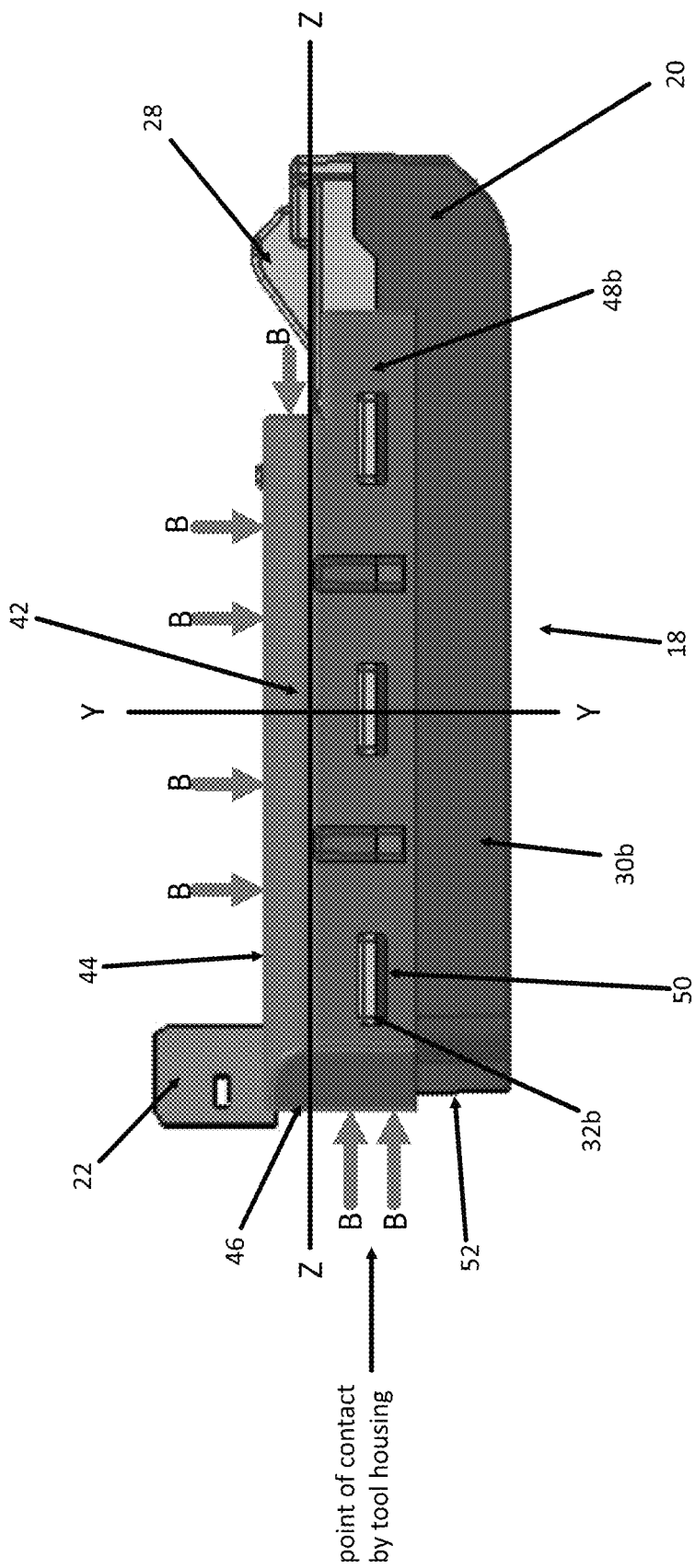
FIG. 8 is a right side, elevation view of the battery pack interface of FIG. 7 and an example vibration isolation element.

Referring to FIGS. 5-7, the battery pack receptacle 16 includes a battery pack interface 18. The battery pack interface 18 is designed and configured to intermate— couple— with a correspondingly designed and configured power tool interface 102 of a removable battery pack 100, as illustrated in the example battery pack of FIGS. 38-43. Together, the battery pack interface 18 (of the power tool) and the power tool interface 102 (of the battery pack) form the power tool-battery pack interface—referred to herein as the TP interface. The TP interface mechanically couples the power tool 10 and the battery pack 100 to allow the battery pack 100 to be coupled to and to be removed from the power tool 10. In other words, to allow the battery pack 100 to be detachably, removable from the power tool 10 and yet still allow the battery pack 100 to couple to the power tool 10 to enable the power 10 to usefully operate as intended. The TP interface includes a mechanical coupling system. Generally speaking, the coupling system may be a slide type coupling system or a tower type coupling system or some other type of coupling system. A slide type coupling system is illustrated in the example power tool 10 and example battery pack 100. Alternate coupling systems are also contemplated by this disclosure.

Referring to FIGS. 6-17, in the example embodiment, the battery pack (BP) interface 18 may include a housing 20 and a set of (or a plurality of) power tool terminals 22. The battery pack interface 18 may be formed by molding the battery pack interface housing 20 about the set of power tool terminals 22. In other words, the set of power tool terminals 22 may be placed in a mold and plastic material, such as, for example acrylonitrile butadiene styrene (ABS) or nylon polyamide (PA) or polycarbonate (PC) or polypropylene (PP), may be, for example, injection molded about the set of power tool terminals 22. The battery pack interface housing 20 holds the set of power tool terminals 22 in a fixed position relative to each other. The set of power tool terminals 22 is designed and configured to mate with a correspondingly designed and configured set of battery pack terminals 104 to transfer electricity between the power tool 10 and the battery pack 100.

The battery pack interface housing 20 may include a set of rails 26 and a set of grooves 28. The set of rails and grooves 26/28 are designed and configured to cooperate with/intermate with/assemble with a correspondingly designed set of rails and grooves 106/108 of the power tool interface 102 of the removable battery pack 100. The battery pack interface housing 20 may also include a recess or catch 28. The catch 28 is designed and configured to receive a correspondingly designed latch 110 of the power tool interface 102 of the removable battery pack 100.

The battery pack interface housing 20 may also include a pair of opposing, generally parallel side walls 30a, 30b. One of the side walls is on each side of and is generally parallel to the YZ-plane. The battery pack interface housing 20 may also include a set of protrusions 32. The set of protrusions 32 may include a first subset of protrusions 32a extending in a first direction and a second subset of protrusions 32b extending in a second direction. The first direction being generally perpendicular to the first side wall 30a and away from the YZ-plane. The second direction being generally perpendicular to the second side wall 30b and opposite to the first direction. The battery pack interface housing 20 may also include a top wall 34. The top wall 34 is generally in a plane formed by X-axis and the Z-axis (the XZ-plane) and bisected by the YZ-plane. The set of protrusions 32 may include a third subset of protrusions 32c extending in a third direction. The third direction is generally perpendicular to the XZ-plane/top wall 34 and away from the battery pack interface housing 20. The battery pack interface housing 20 may also include a rear wall 52.

The power tool terminals 22 may be connected to a power tool control assembly/module/electronics/circuitry 36 and/or a power tool motor 38 by a set of power tool wires 40.

Referring to FIGS. 8-11, the power tool 10 may also include a vibration isolation (VI) element 42. The vibration isolation element 42 may, for example, be made of a thermoplastic elastomer (TPE) or rubber. The vibration isolation element 42 may be formed separately from the battery pack interface housing 20. The vibration isolation element 42 may be made of a pliant, compliant, soft material. The vibration isolation element 42 includes a top wall 44, a rear wall 46 and two side walls 48a, 48b. The top wall 44 is generally perpendicular to the side walls 48a, 48b and the rear wall 46. The rear wall 46 is generally perpendicular to the top wall 44 and the two side walls 48a, 48b. The two side walls 48a, 48b are generally parallel to each other and at opposing ends of the top wall 44. The two side walls 48a, 48b are also generally perpendicular to the top wall 44 and the rear wall 46. The vibration isolation element 42 includes a set of receptacles 50, wherein each of the top wall 44, the rear wall 46 and the two side walls 48a, 48b include a subset of receptacles of the set of receptacles 50. The receptacles 50 may take the form of a through hole or full opening in the wall or cutouts or recesses or cavities in the wall from an interior side of the wall. The vibration isolation element 42 also includes a cutout 54 at a portion of the intersection of the top wall 44 and the rear wall 46. The top wall 44, the rear wall 46 and the two side walls 48a, 48b of the vibration isolation element 42 form (define) an interior volume.

The vibration isolation element 42 may be fixed to the battery pack interface housing 20 such that the top wall 44 of the vibration isolation element 42 abuts at least a portion of the top wall 34 of the battery pack interface housing 20 and each of the side walls 48a, 48b of the vibration isolation element 42 abuts at least a portion of one of the side walls 30a, 30b of the battery pack interface housing 20 and the rear wall 46 of the vibration isolation element 42 abuts at least a portion of the rear wall 52 of the battery pack interface housing 20. At least a portion of the battery pack interface housing 20 is positioned in at least a portion of the interior volume formed by the top wall 44, the rear wall 46 and the side walls 48a, 48b of the vibration isolation element 42. The power tool terminals 22 extend through the cutout 54 at the portion of the intersection of the top wall 44 and the rear wall 46 of the vibration isolation element 42. The first set of protrusions 32a are received in the corresponding subset of receptacles 50a in the first side wall 48a of the vibration isolation element 42. The second set of protrusions 32b are received in the corresponding subset of receptacles 50b in the second side wall 48b of the vibration isolation element 42. The third set of protrusions 32c are received in the corresponding set of receptacles 50c in the top wall 44 of the vibration isolation element 42. The connection between the protrusions 32 of the battery interface housing 20 and the receptacles 50 of the vibration isolation element 42 assist to keep the vibration isolation element 42 on the battery interface housing 20.

The power tool 10 also includes a trigger 56 to activate a motor 38. The power tool 10 may include various controls and/or indicators.

As illustrated in FIGS. 12-16, the power tool housing includes the battery pack receptacle 16. The battery pack receptacle 16 includes portions of the power tool housing 12. The battery pack receptacle 16 includes a first side wall or portion 60, a second side wall or portion 62, an interior base wall or portion 64, a rear wall or portion 66 and a front wall or portion 68. The first and the second side walls 60, 62, the interior base wall 64 and the rear wall 66 of the power tool housing 12 form an interior volume. At least a portion of an assembly comprising the vibration isolation element 42 and the battery interface housing 20 are received in at least a portion of the interior volume of the power tool housing 12. The portion of the power tool housing 12 that forms the battery pack receptacle 16 is sometimes referred to as a shroud.

The interior base wall 64 of the power tool housing 12 may include a set (plurality) of protrusions 70 extending into the interior volume of the power tool housing 12. The base wall protrusions 70 extend towards the vibration isolation element/battery interface housing assembly. The base wall protrusions 70 engage and press against the vibration isolation element 42 when the vibration isolation element/battery interface housing assembly is positioned and received in the interior volume of the power tool housing 12. The rear wall 66 of the power tool housing 12 may include a set (plurality) of protrusions 72 extending into the interior volume of the power tool housing 12. The rear wall protrusions 72 extend towards the vibration isolation element/battery interface housing assembly. The rear wall protrusions 72 engage and press against the vibration isolation element 42 when the vibration isolation element/battery interface housing assembly is positioned and received in the interior volume of the power tool housing 12. The front portion of the power tool housing 12 includes a shoulder or interior wall 74. The front portion shoulder 74 includes an interior surface 76. The interior surface 76 of the front portion shoulder 74 engages and presses against a forward or front portion 78 of the vibration isolation element 42—a front end of the top wall of the vibration isolation element 42. The arrows B in FIG. 8 indicate locations the power tool housing protrusions 70, 72 press against the vibration isolation element 42 when the battery pack interface housing 20 and vibration isolation element 42 (collectively, sometimes referred to as the battery pack interface 18) are positioned in the battery pack receptacle (shroud) 16 within at least a portion of the interior volume formed by the battery pack receptacle (shroud) 16.

Figure 16:
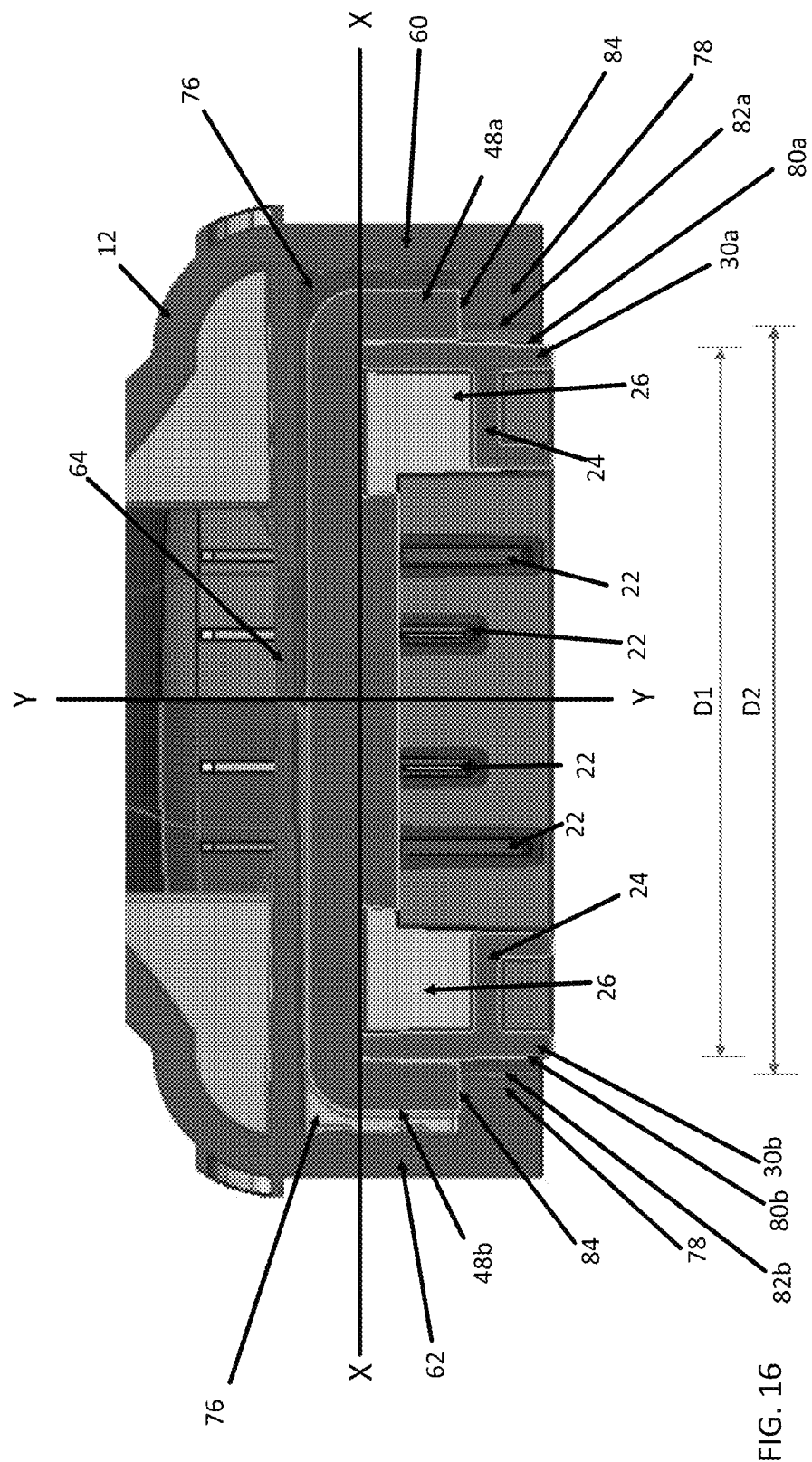
FIG. 16 is a section view of the power tool of FIG. 1 along section lines A-A.

Referring to FIG. 16, each of the side walls 60, 62 of the battery pack receptacle 16 of the power tool housing 12 include a groove 76 and a rail 78—sometimes referred to as a flange. The side walls 30a, 30b of the battery interface housing 20 have outer wall surfaces 80a, 80b. The outer wall surfaces 80a, 80b of the side walls 30a, 30b of the battery interface housing 20 are spaced apart along the X-axis a first distance D1. Each of the rails 78 of the battery receptacle 16 includes an interior surface 82a, 82b. The interior surfaces 82a, 82b of the battery receptacle rails 78 are generally parallel to the outer wall surfaces 80a, 80b of the battery interface housing side walls 30a, 30b. The interior surfaces 82a, 82b of the battery receptacle rails 78 are spaced apart along the X-axis a second distance D2. The second distance D2 is greater than the first distance D1.

Referring to FIG. 16, the grooves 76 of the power tool housing 12 are shaped and configured to receive the side walls 48a, 48b of the vibration isolation element 42. A shoulder or wall 84 connecting the grooves 76 of the power tool housing 12 to the rails 78 of the power tool housing 12 is generally perpendicular to the side wall 48a, 48b of the vibration isolation element 42 and the battery interface housing 20. As such, when the assembly comprising the vibration isolation element 42 and the battery interface housing 20 are received in the interior volume of the power tool housing 12, the side walls 48a, 48b of the vibration isolation element 42 are received in respective grooves 76 of the battery pack receptacle 16 and the side walls 48a, 48b of the vibration isolation element 42 abut the shoulder 84 of the battery pack receptacle 16 of the power tool housing 12. As such, the assembly of the vibration isolation element 42 and the battery interface housing 20 (VI element/BP interface assembly) are fixedly attached or held in place to the power tool housing 12 while at the same time the power tool housing 12 does not touch the battery pack interface housing 20.

This configuration allows for a full six degrees of movement of the battery pack interface 18 relative to the power tool housing 12 about the X-axis, Y-axis and Z-axis. In this manner, the power tool housing 12 is able to move independently of the battery pack interface housing 20. As such, any vibrations produced by the power tool motor 38 or power tool application element 86 that are translated to the power tool housing 12 will not be translated to an attached battery pack 100 or will be attenuated significantly.

Figure 17:
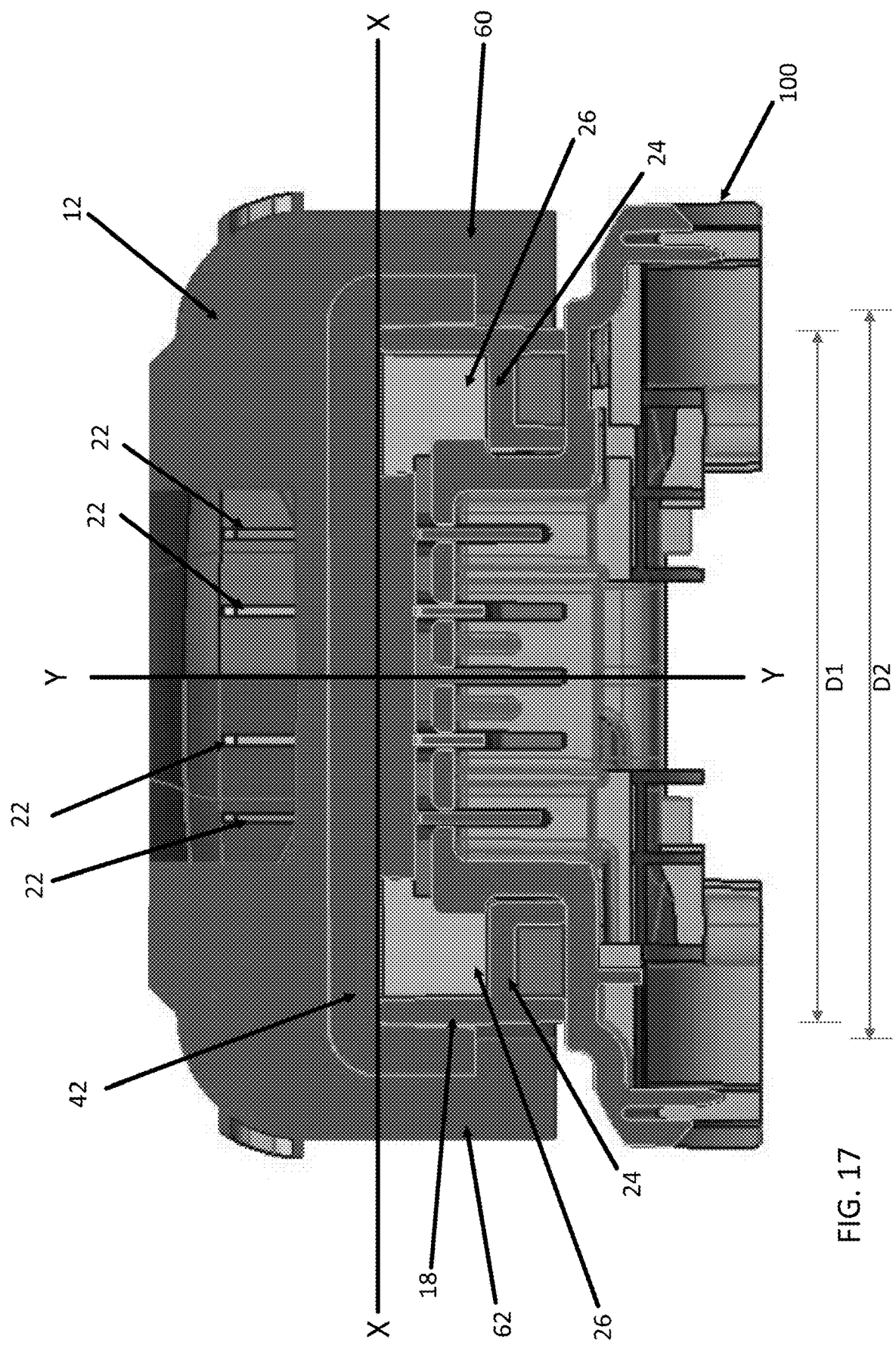
FIG. 17 is a section view of the power tool of FIG. 1 coupled to an example battery pack.
Figure 19:
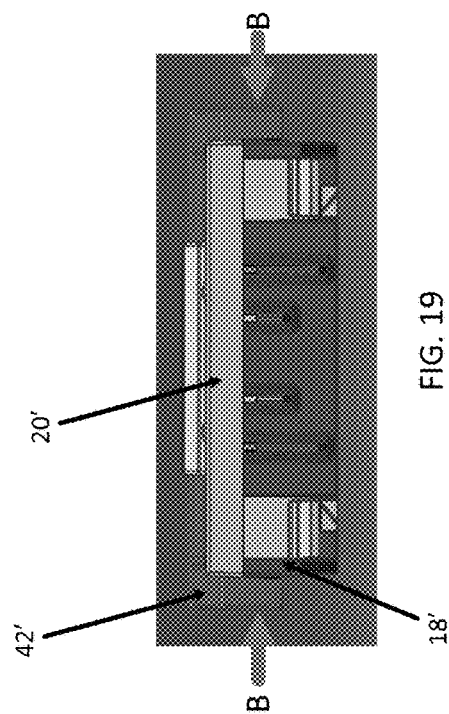
FIG. 19 is a front elevation view of the example battery pack interface and vibration isolation element of FIG. 18.
Figure 18:
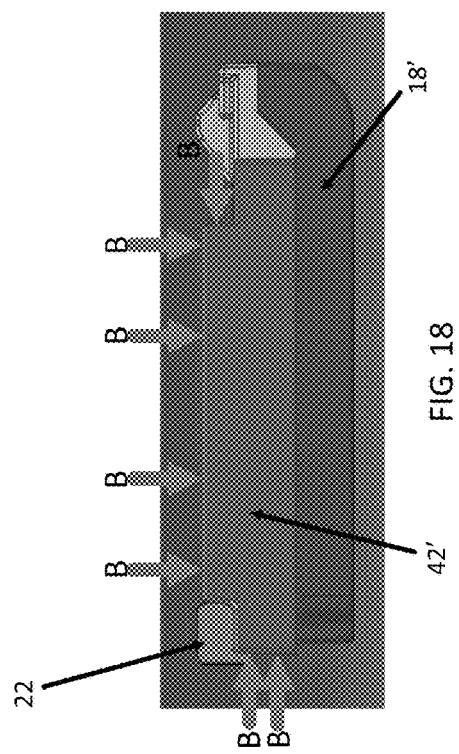
FIG. 18 is a right, side elevation view of another example battery pack interface coupled to another example vibration isolation element.
Figure 21:
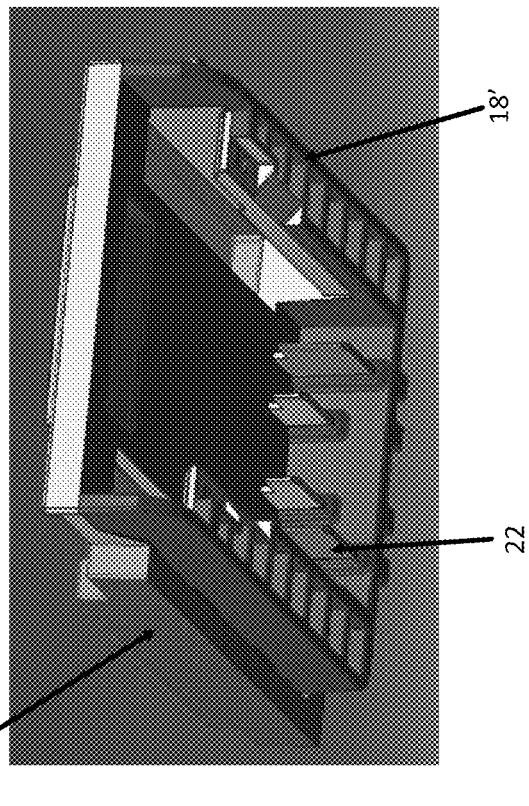
FIG. 21 is lower, front, right side isometric view of the battery pack interface and vibration isolation element of FIG. 18.
Figure 20:
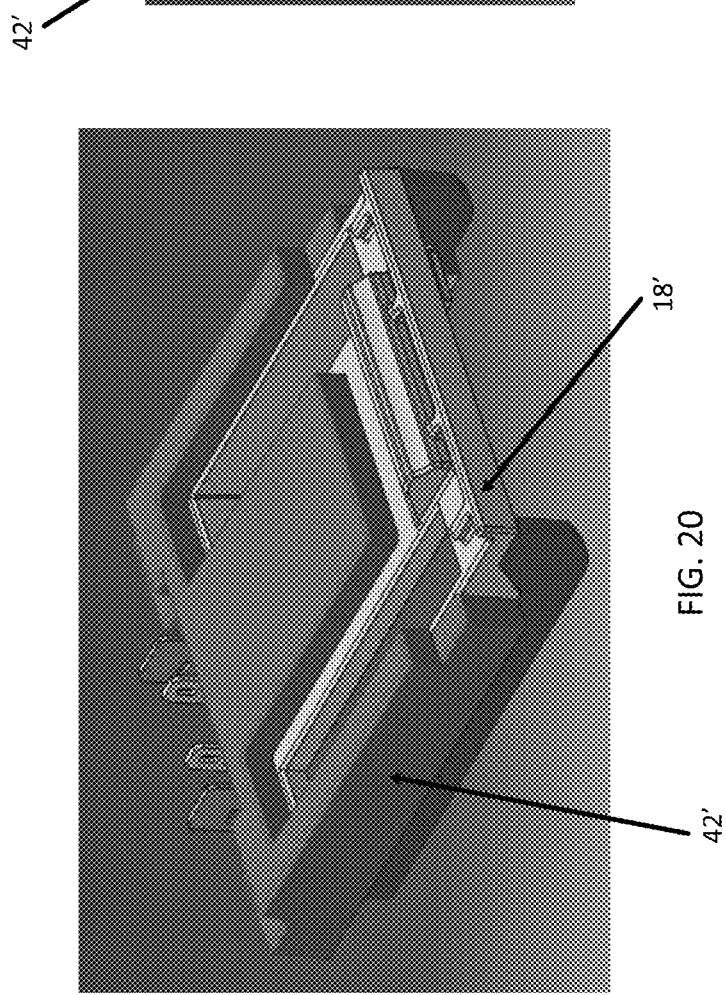
FIG. 20 is upper, front, right side isometric view of the battery pack interface and vibration isolation element of FIG. 18.
Figure 23:
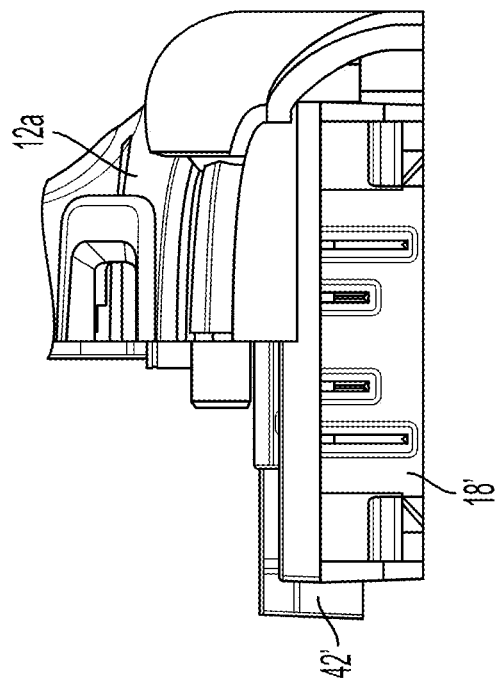
FIG. 23 is a front elevation view of the portion of the power tool housing, the battery pack interface and the vibration isolation element of FIG. 22.
Figure 22:
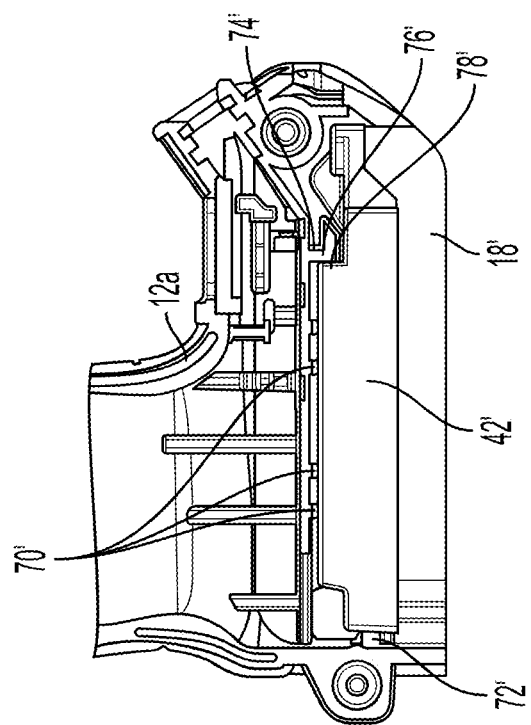
FIG. 22 is a right side, elevation view of the battery pack interface and the vibration isolation element of FIG. 18 and a portion of a power tool housing of the power tool of FIG. 1.
Figure 25:
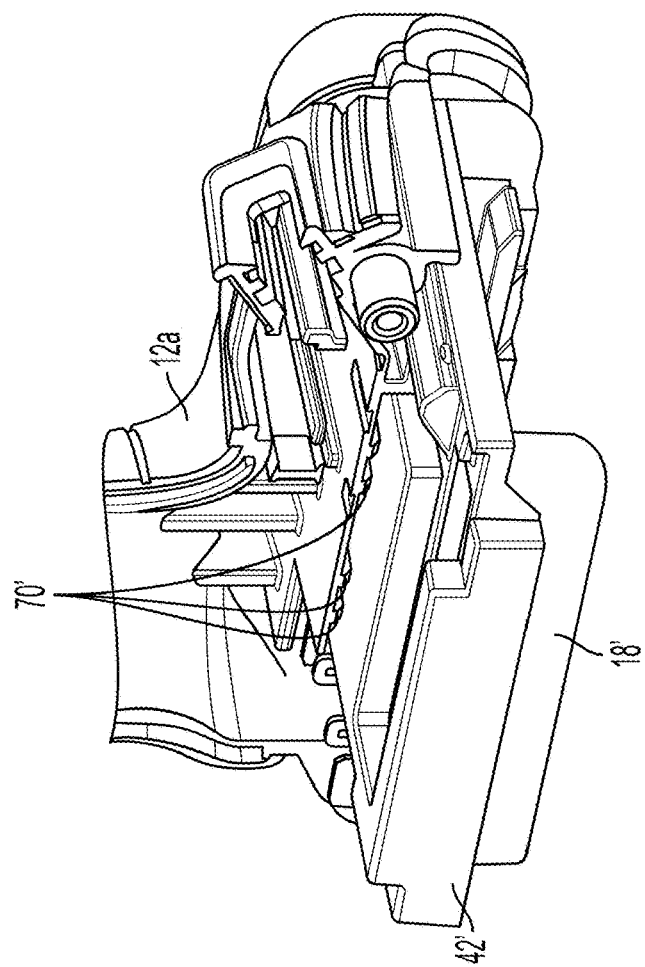
FIG. 25 is an upper, front, right side isometric view of the portion of the power tool housing, the battery pack interface and the vibration isolation element of FIG. 22.
Figure 24:
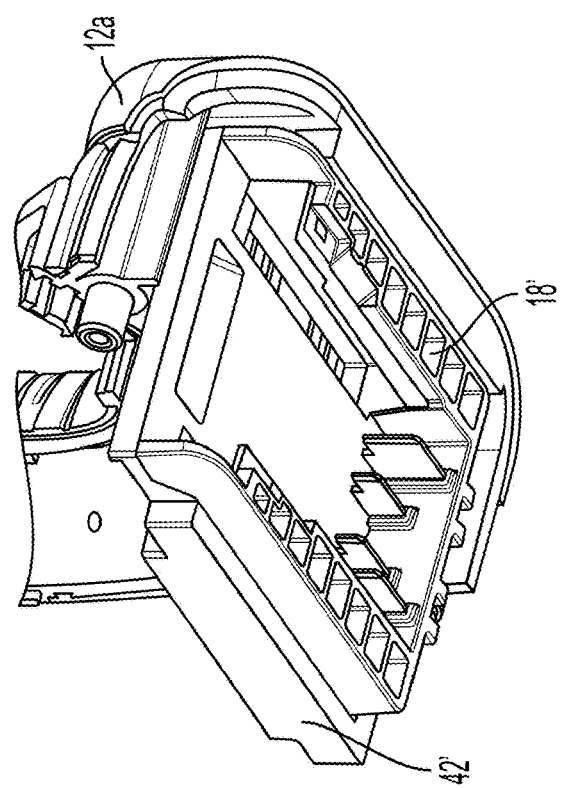
FIG. 24 is a lower, front, right side isometric view of the portion of the power tool housing, the battery pack interface and the vibration isolation element of FIG. 22.

Referring to FIG. 17, when a battery pack 100 is coupled to the power tool 10 by the battery pack interface 18, the battery pack 100 will be able to move independently from the power tool 10 due to the isolation between the battery pack 100/battery pack interface housing 20 and the power tool housing 12 resulting from the vibration isolation element 42.

FIGS. 18-21 illustrate an alternate embodiment of an assembly comprising another example vibration isolation element 42' and another example battery pack interface 18'. In this example embodiment, the vibration isolation element 42' has a different configuration. Operationally, this example embodiment operates in the same manner as the first example embodiment. The power tool terminals 22 may be insert molded within the battery pack interface housing 20'. The battery pack interface housing 20' operates as a terminal block. The battery pack interface housing 20' holds the power tool terminals 22 in a fixed relationship to each other.

FIGS. 22-25 illustrate the second vibration isolation element 42'/battery pack interface 18' assembly coupled to an example power tool 10'. This configuration operates similarly to the first assembly and power tool combination to isolate the battery pack interface from the power tool housing. The interior base wall 64' of the power tool housing 12' may include a set (plurality) of power tool protrusions 70' extending into the interior volume of the power tool housing 12'. The interior base wall protrusions 70' extend towards the vibration isolation element 42'/battery pack interface housing 20' assembly. The interior base wall protrusions 70' engage and press against the vibration isolation element 42' when the vibration isolation element 42'/battery pack interface housing 20' assembly is positioned and received in the interior volume of the power tool housing 12'. The rear wall 66' of the power tool housing 12' may include a set (plurality) of power tool protrusions 72' extending into the interior volume of the power tool housing 12'. The rear wall protrusions 72' extend towards the vibration isolation element 42'/battery pack interface housing 20' assembly. The rear wall protrusions 72a' engage and press against the vibration isolation element 42' when the vibration isolation element 42'/battery pack interface housing 20' assembly is positioned and received in the interior volume of the power tool housing 12'. The front portion of the power tool housing 12' includes a shoulder or interior wall 74'. The front portion shoulder 74' includes an interior surface 76'. The interior surface 76' of the front portion shoulder 74' engages and presses against a forward or front portion of the vibration isolation element 78'—a front end of the top wall of the vibration isolation element. The arrows B in FIG. 18 indicate locations the power tool housing protrusions 70' press against the vibration isolation element 42' when the battery pack interface 18' and vibration isolation element 42' are received and positioned in the battery pack receptacle 16' within at least a portion of the interior volume formed by the battery pack receptacle 16'.

FIG. 26 illustrates the second example vibration isolation element/battery pack interface assembly coupled to a battery pack 100. As the power tool housing 12' only touches the vibration isolation element 42' and does not touch the battery pack interface housing 20', the battery pack 100 and battery pack interface housing 20' are vibrationally isolated from the power tool housing 12' by the vibration isolation element 42'.

Figure 27:
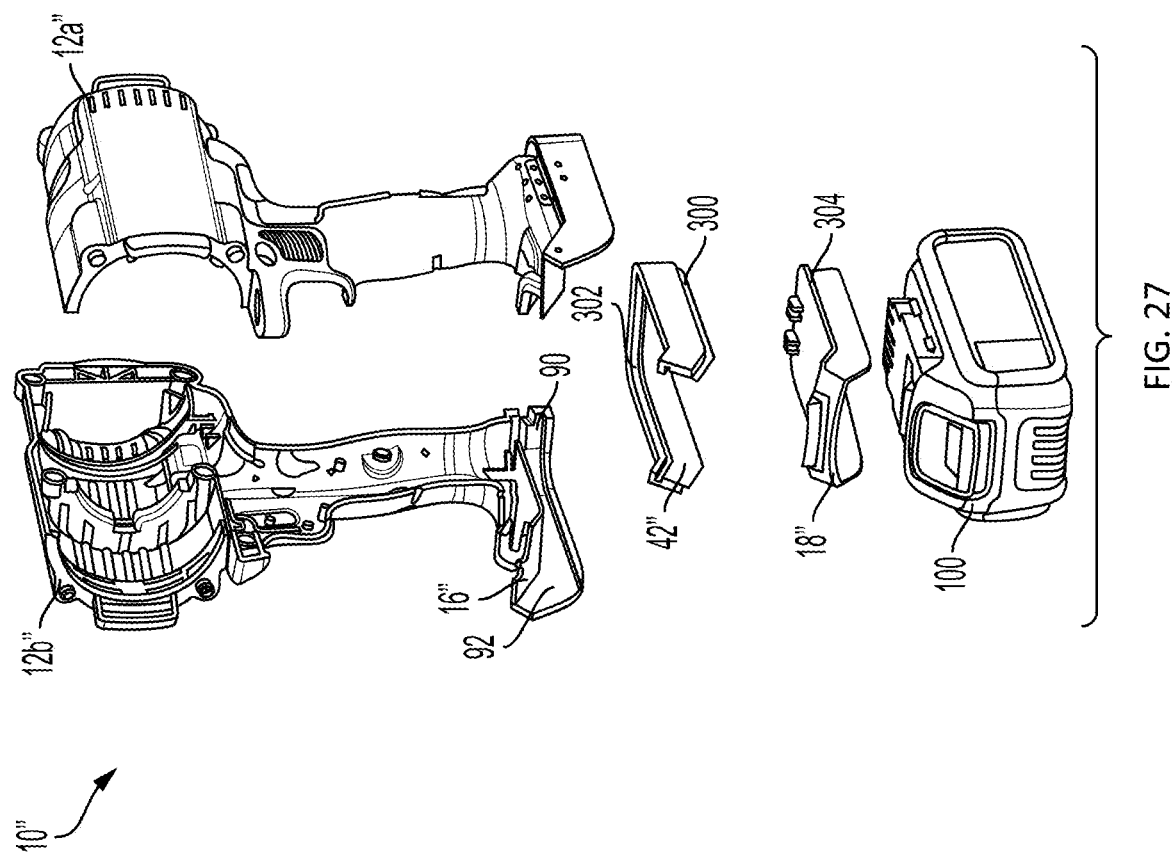
FIG. 27 is an exploded, isometric view of an example power tool including another example battery pack interface and another example vibration isolation element and an example battery pack.
Figure 31:
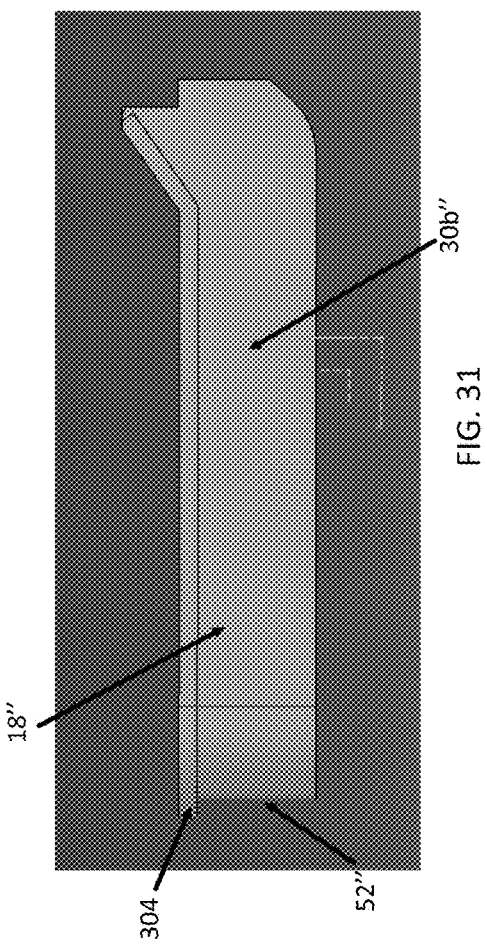
FIG. 31 is a right side, elevation view of the battery pack interface of FIG. 27.
Figure 30:
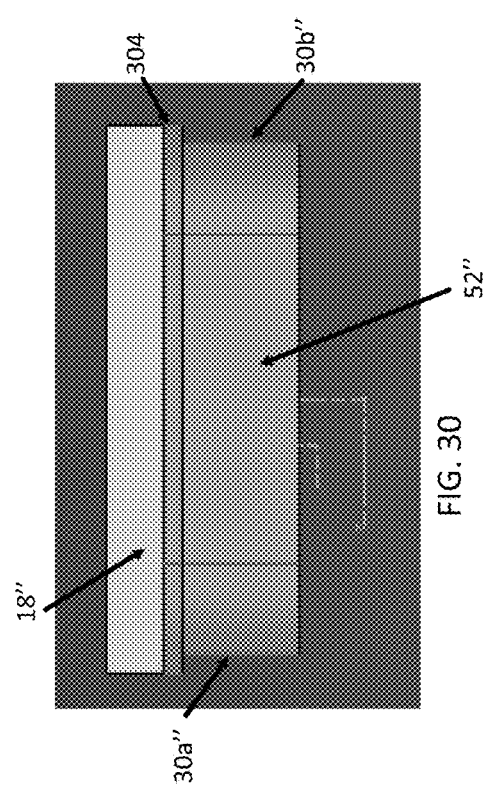
FIG. 30 is a rear, elevation view of the battery pack interface of FIG. 27.
Figure 32:
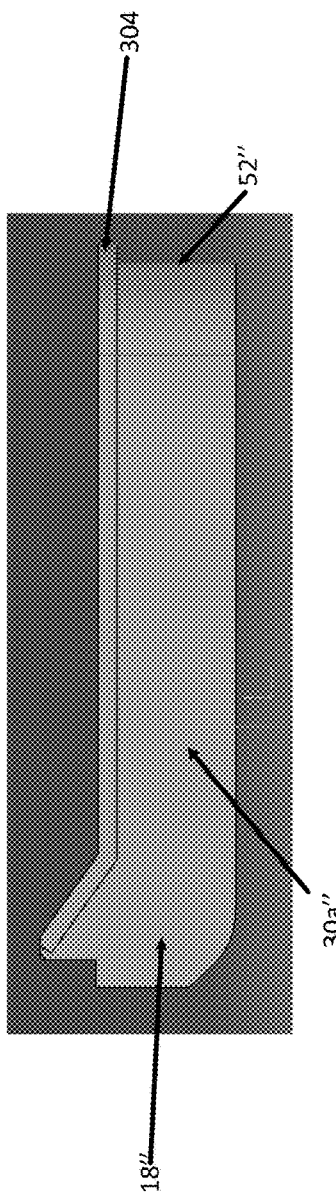
FIG. 32 is a left side, elevation view of the battery pack interface of FIG. 27.
Figure 34:
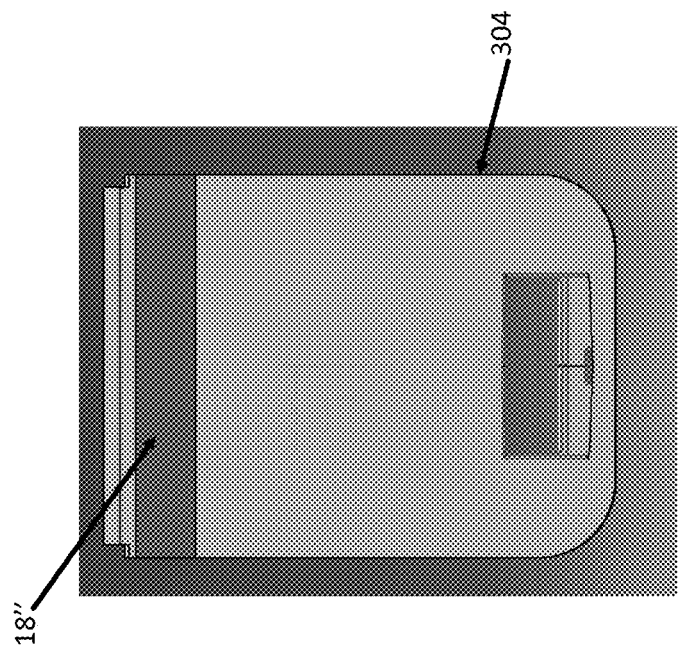
FIG. 34 is a top, plan view of the battery pack interface of FIG. 27.
Figure 33:
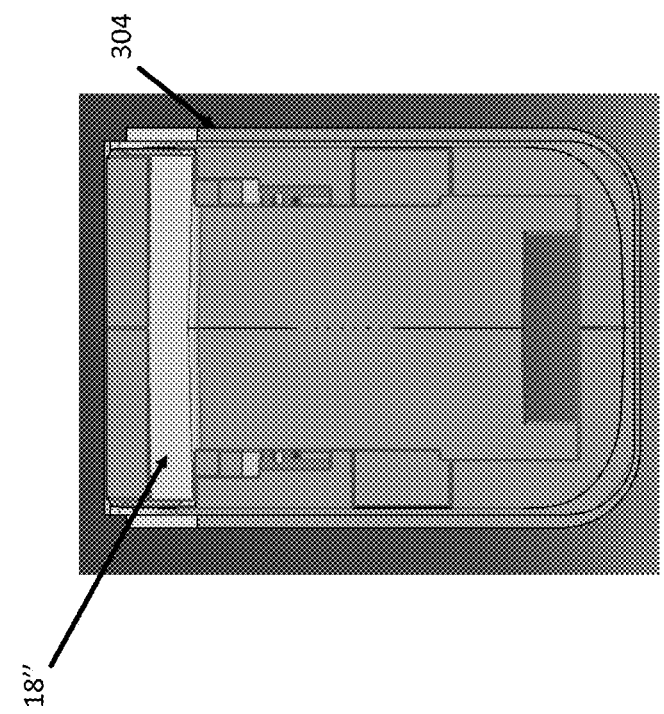
FIG. 33 is a bottom, plan view of the battery pack interface of FIG. 27.

FIGS. 27-37 illustrate another example embodiment of a power tool 10" including another example vibration isolation element 42" and another example battery pack interface 18'. FIG. 27 illustrates an exploded view of the example vibration isolation element 42" and the example battery pack interface 18"'. FIGS. 28-34 illustrated various views of the third example battery pack interface 18"'.

Figure 35:
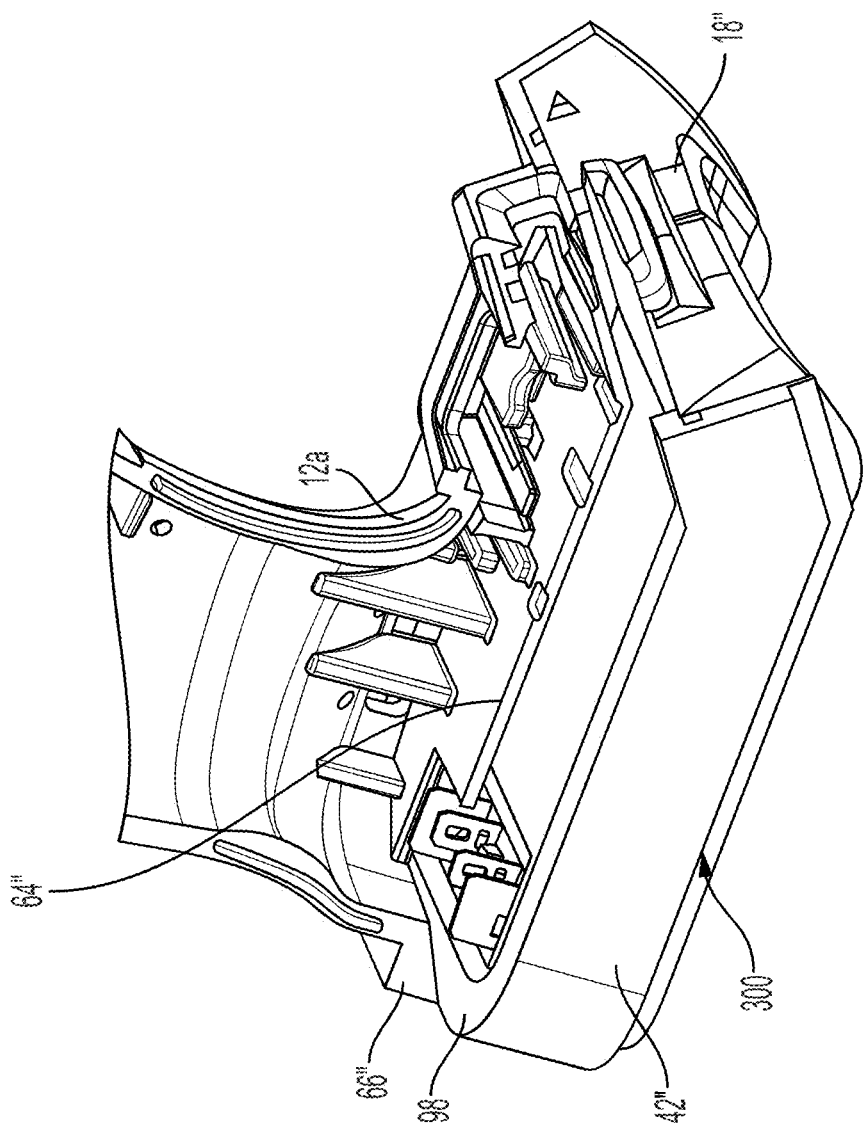
FIG. 35 is an upper, front, right side isometric view of a portion of the power tool housing, the battery pack interface and the vibration isolation element of FIG. 27.
Figure 36:
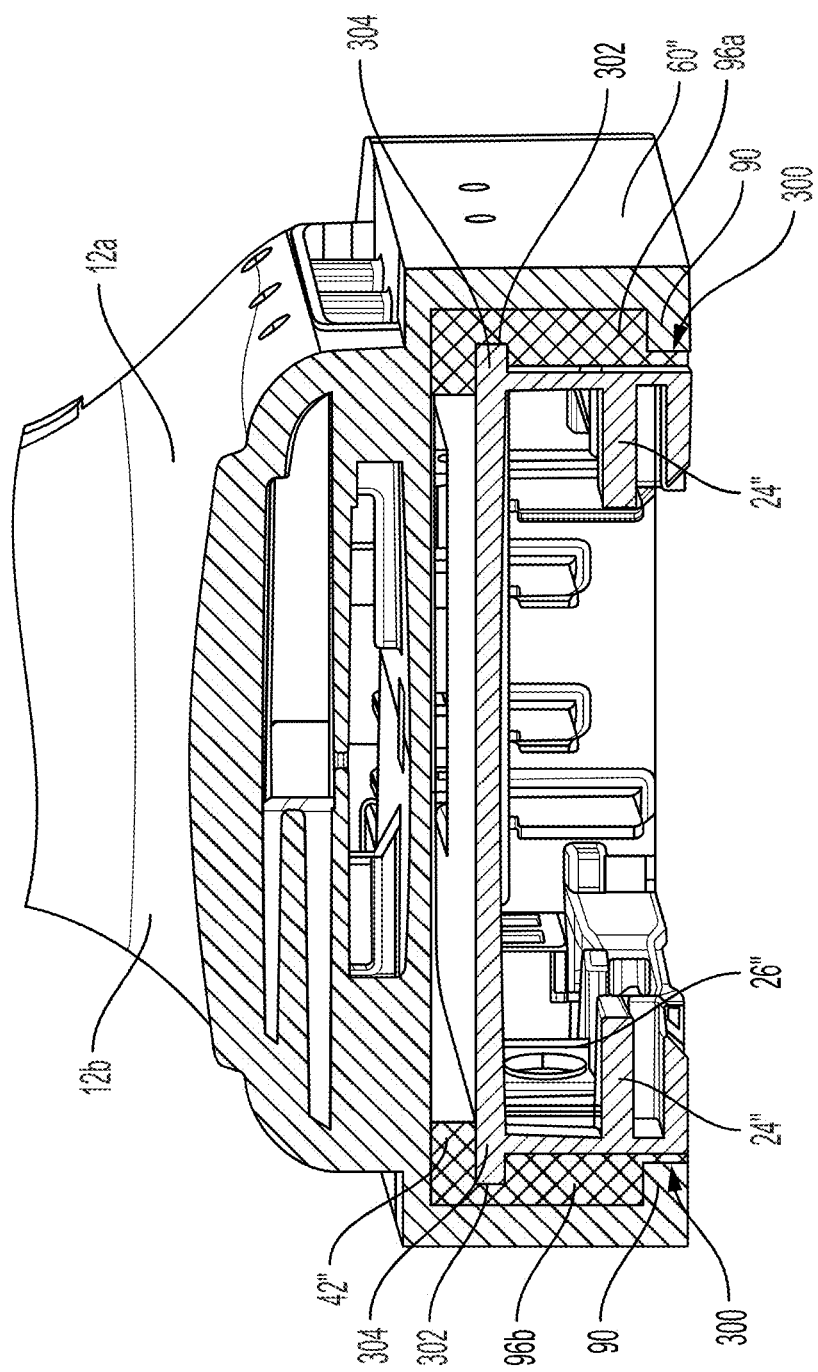
FIG. 36 is an upper, front, left side isometric view of the portion of the power tool housing, the battery pack interface and the vibration isolation element of FIG. 27.
Figure 37:
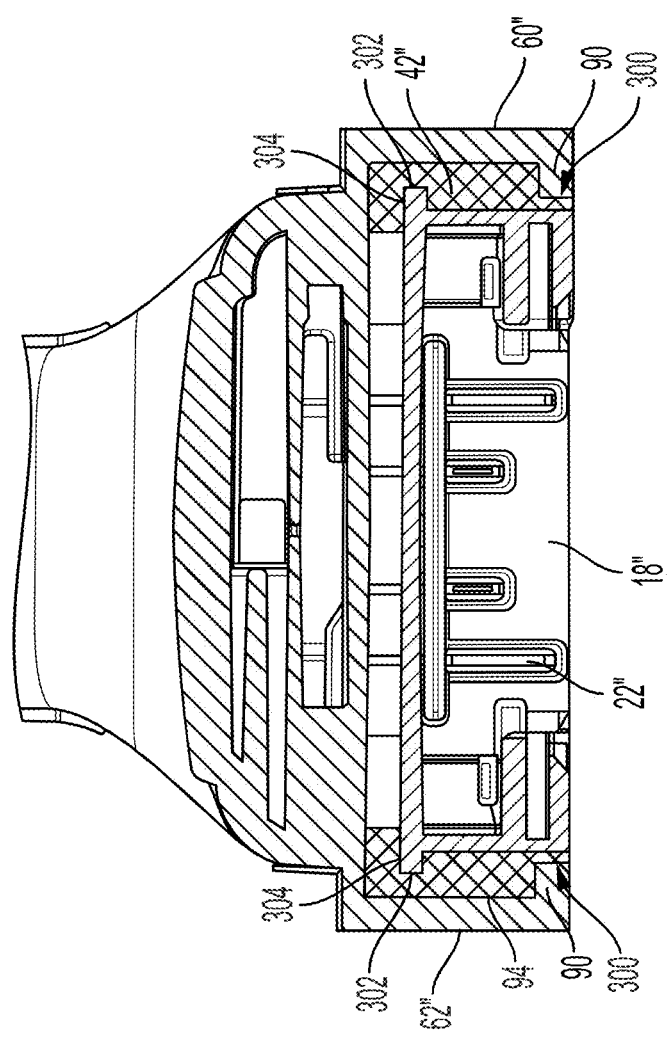
FIG. 37 is a front elevation view of the portion of the power tool housing, the battery pack interface and the vibration isolation element of FIG. 27.
Figure 38:
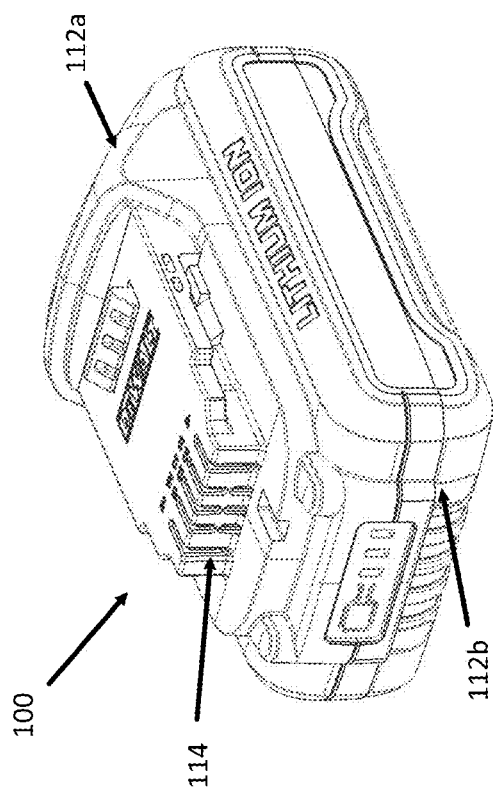
FIG. 38 is an upper, rear, right side isometric view of an example battery pack.
Figure 39:
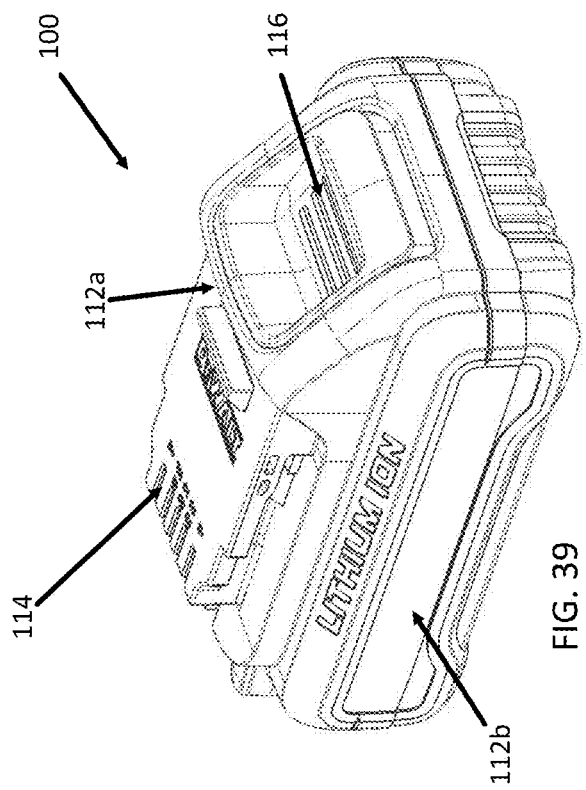
FIG. 39 is an upper, front, right side isometric view of the battery pack of FIG. 38.

FIGS. 35-37 illustrate the example power tool including the example vibration isolation element/battery pack interface assembly. Again, in this example, the power tool housing is isolated from the battery pack interface by the vibration isolation element. In other words, the power tool housing does not touch the battery pack interface. The battery pack interface is able to move independently from the power tool housing. This reduces the vibrational effects of the power tool motor on the power tool housing and the battery pack.

As illustrated in FIG. 27, the power tool 10" may include a housing 12" including a right side portion 12b" and a left side portion 12a". The power tool 10" may include the example vibration isolation element 42" and the battery pack interface 18"'. Together, the right and left sides of the power tool housing 12a", 12b" form a battery pack receptacle 16" at a foot of the housing 12". The battery pack receptacle 16" includes opposing side walls 60", 62" and a rear wall 66". The opposing side walls 60", 62" and the rear wall 66" are formed by a portion of the power tool housing 12". The battery pack receptacle 16" may also include an interior base wall 64" formed by a portion of the power tool housing 12". The opposing side walls 60", 62" and the rear wall 66" are generally perpendicular to the interior base wall 64". Together, the opposing side walls 60", 62", the rear wall 66" and the interior base wall 64" form an interior volume or cavity in the power tool 10". An interior flange or rail 90 may be formed along an interior wall 92 formed by the opposing side walls 60", 62" and the rear wall 66". The interior wall 92 is generally perpendicular to the interior base wall 64". A groove 94, defined by the interior flange 90 and the interior base wall 64", is formed along the interior wall 92.

The vibration isolation element 42" may be a single piece of compliant material, such as a thermoplastic elastomer (TPE) or rubber. The vibration isolation element 42" may be a generally U-shaped part having opposing side walls 96a, 96b and a rear wall 98 connecting the opposing side walls 96a, 96b. The vibration isolation element 42" may include an exterior groove 300 formed on an exterior surface of a wall formed by the opposing side walls 96a, 96b and the rear wall 98 of the vibration isolation element 42". The vibration isolation element 42" and the battery pack receptacle 16" are designed and configured such that the opposing side walls 96a, 96b and the rear wall 98 of the vibration isolation element 42" fit into the groove 94 formed by the interior flange 90 and the interior base wall 64" of the battery pack receptacle 16" and that the interior flange 90 of the battery pack receptacle 16" of the power tool housing 12" is received in the exterior groove 300 of the vibration isolation element 42".

The vibration isolation element 42" may include an interior groove 302 formed on an interior surface of the wall formed by the opposing side walls 96a, 96b and rear wall 98 of the vibration isolation element 42".

The battery pack interface 18" may include an exterior flange 304 formed on an exterior surface of a wall formed by opposing side walls 30a", 30b" and a rear wall 52" of the battery pack interface 18". The battery pack interface 18" and the vibration isolation element 42" are designed and configured such that the exterior flange 304 formed on the battery pack interface 18" is received in the interior groove 302 formed in the interior surface of the vibration isolation element 42".

The battery pack interface 18" may include a set of rails 24" and a set of groove 26" and a set of power tool terminals 22". The power tool terminals 22" may be set in a discrete terminal block that is molded about the set of power tool terminals 22" and then placed in the battery pack interface housing 20" or the entire battery pack interface housing 20" may be formed about the set of power tool terminals 22", thereby removing the need for a discrete terminal block.

The set of rails 24" and grooves 26" of the battery pack interface 18" are designed and configured to mate with a correspondingly designed and configured set of rails 106 and grooves 108 of a set of battery packs 100.

When assembled, the exterior flange 304 of the battery pack interface housing 20" is received in the interior groove 302 of the vibration isolation element 42". This design and configuration essentially locks the vibration isolation element 42" onto the battery pack interface housing 20". The tool housing halves 12a", 12b" also have a flange 90. When assembled, the interior flange 90 of the tool housing 12" is received in the exterior groove 300 of the vibration isolation element 42". This design and configuration essentially locks the tool housing 12" onto the vibration isolation element 42". In this configuration, the tool housing 12" does not touch the battery pack interface housing 20". This configuration isolates the tool housing 12" from the battery pack interface 18" and allows the battery pack interface 18" to move independently from the tool housing 12". Sandwiching the vibration isolation element 42" between the tool housing 12" and the battery pack interface housing 20" keeps the vibration isolation element 42" in place.

The vibration isolation element 42" may be wrapped around the battery pack interface housing 20" and then the battery pack interface housing 20"/vibration isolation element 42" assembly may then be assembled with the power tool housing 12".

FIGS. 38-43 illustrate an example battery pack 100 that may be mated to and used in combination with any of the example power tools described above. The battery pack 100 may include a battery pack housing 112. The battery pack housing 112 may include an upper housing portion 112a and a lower housing portion 112b. The upper housing portion 112a and the lower housing portion 112b mate together to form an interior cavity (not shown). The interior cavity houses the battery cells, electronics, and other components (not shown) of the battery pack 100. The battery pack 100 may include a power tool interface 102. The power tool interface 102 is designed and configured to mate with, for example, a correspondingly designed and configured battery pack interface 18 of a power tool 12. In the example embodiment, the power tool (PT) interface 102 may include a set of slots 114 in the upper housing portion 112a and a set of (or a plurality of) battery pack terminals (not shown) within the interior cavity and aligned with the set of slots 114. The set of battery pack terminals is designed and configured to mate with a correspondingly designed and configured set of power tool terminals 22 to transfer electricity between the power tool 12 and the battery pack 100.

The power tool interface 102 may include a set of rails 106 and a set of grooves 108. The set of rails 106 and grooves 108 are designed and configured to cooperate with/intermate with/assemble with a correspondingly designed set of rails 24 and grooves 26 of the battery pack interface housing 20 of the battery pack interface 18 of the power tool 12. The power tool interface 102 may also include a latch 110 and an activation button 116 to operate the latch 110. The latch 110 is designed and configured to be received by a correspondingly designed catch 28 of the battery pack interface 18 of the power tool 12.

The example battery pack 100 may also operate and mate with various other power tools, for example power tool 12' and power tool 12" in a similar manner as described above.

Numerous modifications may be made to the exemplary implementations described above. These and other implementations are within the scope of this application.

The invention claimed is:

1. A power tool comprising:
   a power tool housing having a battery pack receptacle,
   a battery pack interface, and
   a vibration isolation element positioned between the battery pack receptacle and the battery pack interface, wherein the vibration isolation element is wrapped around a portion of the battery pack interface.

2. The power tool as recited in claim 1, wherein the battery pack interface includes a housing and a set of terminals, the battery pack interface housing including a set of grooves and rails configured to cooperate with a correspondingly configured set of grooves and rails of a power tool interface of a removable battery pack.

3. The power tool, as recited in claim 2, wherein the set of terminals are placed in a mold and plastic material is injection molded into the mold to fix the set of terminals relative to each other and create the battery pack interface housing.

4. A power tool comprising:
- a power tool housing having a battery pack receptacle,
- a battery pack interface, wherein the battery pack interface includes a housing and a set of terminals, the battery pack interface housing including a set of rails configured to cooperate with a correspondingly configured set of grooves of a power tool interface of a removable battery pack and wherein the battery pack interface rails and the power tool terminals are integrally formed in a single piece assembly, and
- a vibration isolation element positioned between the battery pack receptacle and the battery pack interface.

5. The power tool, as recited in claim 4, wherein the single piece terminals/rails assembly is divorced from the power tool housing with 6 degrees of freedom.

\* \* \* \* \*